US011956622B2

(12) United States Patent
Claar

(10) Patent No.: US 11,956,622 B2

(45) Date of Patent: Apr. 9, 2024

(54) METHOD FOR PROVIDING A SPATIALIZED SOUNDFIELD

(71) Applicant: Comhear Inc., San Diego, CA (US)

(72) Inventor: Jeffrey M. Claar, Aliso Viejo, CA (US)

(73) Assignee: Comhear Inc., San Diego, CA (US)

( * ) Notice: Subject to any disclaimer, the term of this patent is extended or adjusted under 35 U.S.C. 154(b) by 0 days.

(21) Appl. No.: 17/839,427

(22) Filed: Jun. 13, 2022

(65) Prior Publication Data

US 2022/0322025 A1 Oct. 6, 2022

Related U.S. Application Data

(63) Continuation of application No. 17/138,845, filed on Dec. 30, 2020, now Pat. No. 11,363,402.

(60) Provisional application No. 62/955,380, filed on Dec. 30, 2019.

(51) Int. Cl.
*H04S 7/00* (2006.01)

(52) U.S. Cl.
CPC .............. *H04S 7/304* (2013.01); *H04S 7/305* (2013.01); *H04S 7/308* (2013.01)

(58) Field of Classification Search
None
See application file for complete search history.

(56) References Cited

U.S. PATENT DOCUMENTS

| | | | |
|---|---|---|---|
| 3,236,949 | A | 2/1966 | Atal |
| 3,252,021 | A | 5/1966 | Terry |
| 5,272,757 | A | 12/1993 | Scofield et al. |
| 5,459,790 | A | 10/1995 | Scofield et al. |
| 5,465,302 | A | 11/1995 | Lazzari et al. |
| 5,661,812 | A | 8/1997 | Scofield et al. |
| 5,841,879 | A | 11/1998 | Scofield et al. |
| 5,943,427 | A | 8/1999 | Massie et al. |
| 5,987,142 | A | 11/1999 | Courneau et al. |
| 6,009,396 | A | 12/1999 | Nagata |
| 6,185,152 | B1 | 2/2001 | Shen |
| 6,442,277 | B1 | 8/2002 | Lueck et al. |
| 6,668,061 | B1 | 12/2003 | Abel |
| 6,694,033 | B1 | 2/2004 | Rimell et al. |
| 6,961,439 | B2 | 11/2005 | Ballas |

(Continued)

FOREIGN PATENT DOCUMENTS

| | | |
|---|---|---|
| WO | WO9730566 | 8/1997 |
| WO | WO9949574 | 9/1999 |
| WO | WO0019415 | 4/2000 |

OTHER PUBLICATIONS

Barreto, Armando, and Navarun Gupta. "Dynamic modeling of the pinna for audio spatialization." WSEAS Transactions on Acoustics and Music 1, No. 1 (2004): 77-82.

(Continued)

*Primary Examiner* — Kenny H Truong
(74) *Attorney, Agent, or Firm* — Hoffberg & Associates; Steven M. Hoffberg

(57) ABSTRACT

A signal processing system and method for delivering spatialized sound by optimizing sound waveforms from a sparse array of speakers to the ears of a user. The system can provide listening areas within a room or space, to provide spatialization sounds to create a 3D audio effect. In a binaural mode, a binary speaker array provides targeted beams aimed towards a user's ears.

20 Claims, 16 Drawing Sheets

(56) References Cited

U.S. PATENT DOCUMENTS

| | | | |
|---|---|---|---|
| 7,164,768 | B2 | 1/2007 | Aylward et al. |
| 7,167,566 | B1 | 1/2007 | Bauck |
| 7,379,961 | B2 | 5/2008 | Matsuoka |
| 7,532,734 | B2 | 5/2009 | Pham et al. |
| 7,792,674 | B2 | 9/2010 | Dalton, Jr. et al. |
| 8,050,433 | B2 | 11/2011 | Kim |
| 8,880,413 | B2 | 11/2014 | Virette et al. |
| 9,042,565 | B2 | 5/2015 | Jot et al. |
| 9,154,896 | B2 | 10/2015 | Mahabub et al. |
| 9,173,032 | B2 | 10/2015 | Brungart et al. |
| 9,197,977 | B2 | 11/2015 | Mahabub et al. |
| 9,215,544 | B2 | 12/2015 | Faure et al. |
| 9,361,896 | B2 | 6/2016 | Disch et al. |
| 9,578,440 | B2 | 2/2017 | Otto et al. |
| 10,499,153 | B1 | 12/2019 | Seldess |
| 2001/0031051 | A1 | 10/2001 | Pineau |
| 2002/0150254 | A1 | 10/2002 | Wilcock et al. |
| 2002/0196947 | A1 | 12/2002 | Lapicque |
| 2003/0059070 | A1 | 3/2003 | Ballas |
| 2004/0141622 | A1 | 7/2004 | Squibbs |
| 2004/0223620 | A1 | 11/2004 | Horbach et al. |
| 2005/0114121 | A1 | 5/2005 | Tsingos et al. |
| 2005/0135643 | A1 | 6/2005 | Lee et al. |
| 2005/0271212 | A1 | 12/2005 | Schaeffer et al. |
| 2006/0045275 | A1 | 3/2006 | Daniel |
| 2006/0056639 | A1 | 3/2006 | Ballas |
| 2007/0109977 | A1 | 5/2007 | Mittal et al. |
| 2007/0286427 | A1 | 12/2007 | Jung et al. |
| 2007/0294061 | A1 | 12/2007 | Carlbom et al. |
| 2008/0004866 | A1 | 1/2008 | Virolainen et al. |
| 2008/0025534 | A1 | 1/2008 | Kuhn et al. |
| 2008/0137870 | A1 | 6/2008 | Nicol et al. |
| 2008/0144794 | A1 | 6/2008 | Gardner |
| 2008/0304670 | A1 | 12/2008 | Breebaart |
| 2008/0306720 | A1 | 12/2008 | Nicol et al. |
| 2009/0046864 | A1 | 2/2009 | Mahabub et al. |
| 2009/0060236 | A1 | 3/2009 | Johnston et al. |
| 2009/0067636 | A1 | 3/2009 | Faure et al. |
| 2009/0116652 | A1 | 5/2009 | Kirkeby et al. |
| 2009/0161880 | A1 | 6/2009 | Hooley et al. |
| 2009/0232317 | A1 | 9/2009 | Emerit et al. |
| 2009/0292544 | A1 | 11/2009 | Virette et al. |
| 2010/0183159 | A1 | 7/2010 | Clot et al. |
| 2010/0198601 | A1 | 8/2010 | Mouhssine et al. |
| 2010/0241439 | A1 | 9/2010 | Mouhssine et al. |
| 2010/0296678 | A1 | 11/2010 | Kuhn-Rahloff et al. |
| 2010/0305952 | A1 | 12/2010 | Mouhssine et al. |
| 2011/0009771 | A1 | 1/2011 | Guillon et al. |
| 2011/0268281 | A1 | 11/2011 | Florencio et al. |
| 2011/0299707 | A1 | 12/2011 | Meyer |
| 2012/0093348 | A1 | 4/2012 | Li |
| 2012/0121113 | A1 | 5/2012 | Li |
| 2012/0162362 | A1 | 6/2012 | Garden et al. |
| 2012/0213375 | A1 | 8/2012 | Mahabub et al. |
| 2012/0314878 | A1 | 12/2012 | Daniel et al. |
| 2013/0046790 | A1 | 2/2013 | Katz et al. |
| 2013/0163766 | A1 | 6/2013 | Choueiri |
| 2014/0016793 | A1 | 1/2014 | Gardner |
| 2014/0064526 | A1 | 3/2014 | Otto et al. |
| 2014/0219455 | A1* | 8/2014 | Peters ........................ H04S 5/00 381/17 |
| 2015/0036827 | A1 | 2/2015 | Rosset et al. |
| 2015/0131824 | A1 | 5/2015 | Nguyen et al. |
| 2016/0014540 | A1 | 1/2016 | Kelly et al. |
| 2016/0050508 | A1 | 2/2016 | Redmann |
| 2017/0070835 | A1 | 3/2017 | Silva |
| 2017/0215018 | A1 | 7/2017 | Rosset et al. |
| 2017/0318407 | A1 | 11/2017 | Meister et al. |
| 2018/0091921 | A1 | 3/2018 | Silva |
| 2018/0217804 | A1 | 8/2018 | Manohar et al. |
| 2018/0288554 | A1 | 10/2018 | Rugeles Ospina et al. |
| 2019/0045317 | A1 | 2/2019 | Badhwar et al. |
| 2019/0116448 | A1 | 4/2019 | Schmidt et al. |
| 2019/0132674 | A1 | 5/2019 | Vilkamo |
| 2019/0166426 | A1 | 5/2019 | Seldess et al. |
| 2019/0268711 | A1 | 8/2019 | Moeller |
| 2019/0289417 | A1 | 9/2019 | Tomlin et al. |
| 2019/0320282 | A1 | 10/2019 | Moeller |

OTHER PUBLICATIONS

Baskind, Alexis, Thibaut Carpentier, Markus Noisternig, Olivier Warusfel, and Jean-Marc Lyzwa. "Binaural and transaural spatialization techniques in multichannel 5.1 production (Anwendung binauraler und transauraler Wiedergabetechnik in der 5.1 Musikproduktion)." 27th Tonmeistertagung—VDT International Convention, Nov. 2012.

Begault, Durand R., and Leonard J. Trejo. "3-D sound for virtual reality and multimedia." (2000), NASA/TM-2000-209606.

Begault, Durand, Elizabeth M. Wenzel, Martine Godfroy, Joel D. Miller, and Mark R. Anderson. "Applying spatial audio to human interfaces: 25 years of NASA experience." In Audio Engineering Society Conference: 40th International Conference: Spatial Audio: Sense the Sound of Space. Audio Engineering Society, 2010.

Bosun, Xie, Liu Lulu, and Chengyun Zhang. "Transaural reproduction of spatial surround sound using four actual loudspeakers." In INTER-NOISE and NOISE-CON Congress and Conference Proceedings, vol. 259, No. 9, pp. 61-69. Institute of Noise Control Engineering, 2019.

Casey, Michael A., William G. Gardner, and Sumit Basu. "Vision steered beam-forming and transaural rendering for the artificial life interactive video environment (alive)." In Audio Engineering Society Convention 99. Audio Engineering Society, 1995.

Cooper, Duane H., and Jerald L. Bauck. "Prospects for transaural recording." Journal of the Audio Engineering Society 37, No. 1/2 (1989): 3-19.

Duraiswami, Grant, Mesgarani, Shamma, Augmented Intelligibility in Simultaneous Multi-talker Environments. 2003, Proceedings of the International Conference on Auditory Display (ICAD'03).

en.wikipedia.org/wiki/Perceptual-based_3D_sound_localization (downloaded Mar. 25, 2021).

Fazi, Filippo Maria, and Eric Hamdan. "Stage compression in transaural audio." In Audio Engineering Society Convention 144. Audio Engineering Society, 2018.

Gardner, William Grant. Transaural 3-D audio. Perceptual Computing Section, Media Laboratory, Massachusetts Institute of Technology, 1995.

Glasal, Ralph, Ambiophonics, Replacing Stereophonics to Achieve Concert-Hall Realism, 2nd Ed (2015).

Glasgal, Ralph. "360 localization via 4. x race processing." In Audio Engineering Society Convention 123. Audio Engineering Society, 2007.

Glasgal, Ralph. "Surround ambiophonic recording and reproduction." In Audio Engineering Society Conference: 24th International Conference: Multichannel Audio, The New Reality. Audio Engineering Society, 2003.

Greff, Raphaël. "The use of parametric arrays for transaural applications." In Proceedings of the 20th International Congress on Acoustics, pp. 1-5. 2010.

Guastavino, Catherine, Véronique Larcher, Guillaume Catusseau, and Patrick Boussard. "Spatial audio quality evaluation: comparing transaural, ambisonics and stereo." Georgia Institute of Technology, 2007.

Guldenschuh, Markus, and Alois Sontacchi. "Application of transaural focused sound reproduction." In 6th Eurocontrol INO-Workshop 2009. 2009.

Guldenschuh, Markus, and Alois Sontacchi. "Transaural stereo in a beamforming approach." In Proc. DAFx, vol. 9, pp. 1-6. 2009.

Guldenschuh, Markus, Chris Shaw, and Alois Sontacchi. "Evaluation of a transaural beamformer." In 27th Congress of the International Council of the Aeronautical Sciences (ICAS 2010). Nizza, Frankreich, pp. 2010-10. 2010.

Guldenschuh, Markus. "Transaural beamforming." PhD diss., Master's thesis, Graz University of Technology, Graz, Austria, 2009.

Hartmann, William M., Brad Rakerd, Zane D. Crawford, and Peter Xinya Zhang. "Transaural experiments and a revised duplex theory for the localization of low-frequency tones." The Journal of the Acoustical Society of America 139, No. 2 (2016): 968-985.

(56) References Cited

OTHER PUBLICATIONS

Herder, Jens. "Optimization of sound spatialization resource management through clustering." In The Journal of Three Dimensional Images, 3D-Forum Society, vol. 13, No. 3, pp. 59-65. 1999.
Hollerweger, Florian. Periphonic sound spatialization in multi-user virtual environments. Institute of Electronic Music and Acoustics (IEM), Center for Research in Electronic Art Technology (CREATE) Ph.D dissertation 2006.
Inkpen, Kori, Rajesh Hegde, Mary Czerwinski, and Zhengyou Zhang. "Exploring spatialized audio & video for distributed conversations." In Proceedings of the 2010 ACM conference on Computer supported cooperative work, pp. 95-98. 2010.
Ito, Yu, and Yoichi Haneda. "Investigation into Transaural System with Beamforming Using a Circular Loudspeaker Array Set at Off-center Position from the Listener." Proc. 23rd Int. Cong. Acoustics (2019).
Johannes, Reuben, and Woon-Seng Gan. "3D sound effects with transaural audio beam projection." In 10th Western Pacific Acoustic Conference, Beijing, China, paper, vol. 244, No. 8, pp. 21-23. 2009.
Jost, Adrian, and Jean-Marc Jot. "Transaural 3-d audio with user-controlled calibration." In Proceedings of COST-G6 Conference on Digital Audio Effects, DAFX2000, Verona, Italy. 2000.
Julius O. Smith III, Physical Audio Signal Processing for Virtual Musical Instruments and Audio Effects, Center for Computer Research in Music and Acoustics (CCRMA), Department of Music, Stanford University, Stanford, California 94305 USA, Dec. 2008 Edition (Beta).
Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, Mar. 2011.
Lauterbach, Christian, Anish Chandak, and Dinesh Manocha. "Interactive sound rendering in complex and dynamic scenes using frustum tracing." IEEE Transactions on Visualization and Computer Graphics 13, No. 6 (2007): 1672-1679.
Liu, Lulu, and Bosun Xie. "The limitation of static transaural reproduction with two frontal loudspeakers." (2019).
Malham, David G., and Anthony Myatt. "3-D sound spatialization using ambisonic techniques." Computer music journal 19, No. 4 (1995): 58-70.
McGee, Ryan, "Sound Element Spatializer." (M.S. Thesis, U. California Santa Barbara 2010).
McGee, Ryan, and Matthew Wright. "Sound Element Spatializer." In ICMC. 2011.
Méaux, Eric, and Sylvain Marchand. "Synthetic Transaural Audio Rendering (STAR): a Perceptive Approach for Sound Spatialization." 2019.
Miller III, Robert E. Robin. "Transforming Ambiophonic+ Ambisonic 3D Surround Sound to & from ITU 5.1/6.1." In Audio Engineering Society Convention 114. Audio Engineering Society, 2003.
Murphy, David, and Flaithrí Neff. "Spatial sound for computer games and virtual reality." In Game sound technology and player interaction: Concepts and developments, pp. 287-312. IGI Global, 2011.
Naef, Martin, Oliver Staadt, and Markus Gross. "Spatialized audio rendering for immersive virtual environments." In Proceedings of the ACM symposium on Virtual reality software and technology, pp. 65-72. ACM, 2002.
Nykänen, Arne, Axel Zedigh, and Peter Mohlin. "Effects on localization performance from moving the sources in binaural reproductions." In International Congress and Exposition on Noise Control Engineering: Sep. 15, 2013-Sep. 18, 2013, vol. 4, pp. 3193-3201.
ÖAL Österreichischer Arbeitsring für Lärmbekämpfung, 2013.
Polk, Matthew S. "SDA™ Surround Technology White Paper." Polk Audio, Nov (2005).
Runkle, Paul, Anastasia Yendiki, and Gregory H. Wakefield. "Active sensory tuning for immersive spatialized audio." Georgia Institute of Technology, 2000.
Samejima, Toshiya, Yo Sasaki, Izumi Taniguchi, and Hiroyuki Kitajima. "Robust transaural sound reproduction system based on feedback control." Acoustical Science and Technology 31, No. 4 (2010): 251-259.
Sawhney, Nitin, and Chris Schmandt. "Design of spatialized audio in nomadic environments." Georgia Institute of Technology, 1997.
Shohei Nagai, Shunichi Kasahara, Jun Rekimot, "Directional communication using spatial sound in human-telepresence." Proceedings of the 6th Augmented Human International Conference, Singapore 2015, ACM New York, NY, USA, ISBN: 978-1-4503-3349-8.
Simon Galvez, Marcos F., and Filippo Maria Fazi. "Loudspeaker arrays for transaural reproduction." (2015).
Simón Gálvez, Marcos Felipe, Miguel Blanco Galindo, and Filippo Maria Fazi. "A study on the effect of reflections and reverberation for low-channel-count Transaural systems." In Inter-Noise and Noise-Con Congress and Conference Proceedings, vol. 259, No. 3, pp. 6111-6122. Institute of Noise Control Engineering, 2019.
Su, Da-Jhuang, and Shih-Fu Hsieh. "Robust Crosstalk Cancellation for 3D Sound using Multiple Loudspeakers." In 2007 IEEE International Conference on Acoustics, Speech and Signal Processing—ICASSP'07, vol. 1, pp. I-181. IEEE, 2007.
Tsingos, Nicolas, Emmanuel Gallo, and George Drettakis. "Perceptual audio rendering of complex virtual environments." ACM Transactions on Graphics (TOG) 23, No. 3 (2004): 249-258.
Verron, Charles, Mitsuko Aramaki, Richard Kronland-Martinet, and Grégory Pallone. "A 3-D immersive synthesizer for environmental sounds." IEEE Transactions on Audio, Speech, and Language Processing 18, No. 6 (2009): 1550-1561 relates to spatialized sound synthesis.
Villegas, Julián, and Takaya Ninagawa. "Pure-data-based transaural filter with range control." (2016).
Volk, Florian, and F. Lindne. "Primary Source Correction (PSC) in Wave Field Synthesis." In Intern. Conf. on Spatial Audio, ICSA 2011, Detmold, Germany. 2011.
Zhang, Wen, Parasanga N. Samarasinghe, Hanchi Chen, and Thushara D. Abhayapala. "Surround by sound: A review of spatial audio recording and reproduction." Applied Sciences 7, No. 5 (2017): 532.
Cobos, M., Ahrens, J., Kowalczyk, K. et al. An overview of machine learning and other data-based methods for spatial audio capture, processing, and reproduction. J Audio Speech Music Proc. 2022, 10 (2022). https://doi.org/10.1186/s13636-022-00242-x.
Pollack, Katharina, Wolfgang Kreuzer, and Piotr Majdak. "Perspective chapter: Modern acquisition of personalised head-related transfer functions—an overview." Advances in Fundamental and Applied Research on Spatial Audio (2022).
Serafin, Stefania, Michele Geronazzo, Cumhur Erkut, Niels C. Nilsson, and Rolf Nordahl. "Sonic interactions in virtual reality: State of the art, current challenges, and future directions." IEEE computer graphics and applications 38, No. 2 (2018): 31-43.

* cited by examiner

Beamforming Mode

Binaural Mode

Binaural mode

METHOD FOR PROVIDING A SPATIALIZED SOUNDFIELD

CROSS REFERENCE TO RELATED APPLICATIONS

The present application is a Continuation of U.S. patent application Ser. No. 17/138,845, filed Dec. 30, 2020, now U.S. Pat. No. 11,363,402, issued Jun. 14, 2022, which is a Non-provisional of, and claims benefit of priority under 35 U.S.C. § 119(e) from U.S. Provisional Application No. 62/955,380, filed Dec. 30, 2019, the entirety of which are expressly incorporated by reference.

FIELD OF THE INVENTION

The present invention relates to digital signal processing for control of speakers and more particularly to a method for signal processing for controlling a sparse speaker array to deliver spatialized sound.

BACKGROUND

Each reference, patent, patent application, or other specifically identified piece of information is expressly incorporated herein by reference in its entirety, for all purposes.

Spatialized sound is useful for a range of applications, including virtual reality, augmented reality, and modified reality. Such systems generally consist of audio and video devices, which provide three-dimensional perceptual virtual audio and visual objects. A challenge to creation of such systems is how to update the audio signal processing scheme for a non-stationary listener, so that the listener perceives the intended sound image, and especially using a sparse transducer array.

A sound reproduction system that attempts to give a listener a sense of space seeks to make the listener perceive the sound coming from a position where no real sound source may exist. For example, when a listener sits in the "sweet spot" in front of a good two-channel stereo system, it is possible to present a virtual soundstage between the two loudspeakers. If two identical signals are passed to both loudspeakers facing the listener, the listener should perceive the sound as coming from a position directly in front of him or her. If the input is increased to one of the speakers, the virtual sound source will be deviated towards that speaker. This principle is called amplitude stereo, and it has been the most common technique used for mixing two-channel material ever since the two-channel stereo format was first introduced.

However, amplitude stereo cannot itself create accurate virtual images outside the angle spanned by the two loudspeakers. In fact, even in between the two loudspeakers, amplitude stereo works well only when the angle spanned by the loudspeakers is 60 degrees or less.

Virtual source imaging systems work on the principle that they optimize the acoustic waves (amplitude, phase, delay) at the ears of the listener. A real sound source generates certain interaural time- and level differences at the listener's ears that are used by the auditory system to localize the sound source. For example, a sound source to left of the listener will be louder, and arrive earlier, at the left ear than at the right. A virtual source imaging system is designed to reproduce these cues accurately. In practice, loudspeakers are used to reproduce a set of desired signals in the region around the listener's ears. The inputs to the loudspeakers are determined from the characteristics of the desired signals, and the desired signals must be determined from the characteristics of the sound emitted by the virtual source. Thus, a typical approach to sound localization is determining a head-related transfer function (HRTF) which represents the binaural perception of the listener, along with the effects of the listener's head, and inverting the HRTF and the sound processing and transfer chain to the head, to produce an optimized "desired signal". Be defining the binaural perception as a spatialized sound, the acoustic emission may be optimized to produce that sound. For example, then HRTF models the pinna of the ears. Barreto, Armando, and Navarun Gupta. "Dynamic modeling of the pinna for audio spatialization." WSEAS Transactions on Acoustics and Music 1, no. 1 (2004): 77-82.

Typically, a single set of transducers only optimally delivers sound for a single head, and seeking to optimize for multiple listeners requires very high order cancellation so that sounds intended for one listener are effectively cancelled at another listener. Outside of an anechoic chamber, accurate multiuser spatialization is difficult, unless headphones are employed.

Binaural technology is often used for the reproduction of virtual sound images. Binaural technology is based on the principle that if a sound reproduction system can generate the same sound pressures at the listener's eardrums as would have been produced there by a real sound source, then the listener should not be able to tell the difference between the virtual image and the real sound source.

A typical discrete surround-sound system, for example, assumes a specific speaker setup to generate the sweet spot, where the auditory imaging is stable and robust. However, not all areas can accommodate the proper specifications for such a system, further minimizing a sweet spot that is already small. For the implementation of binaural technology over loudspeakers, it is necessary to cancel the cross-talk that prevents a signal meant for one ear from being heard at the other. However, such cross-talk cancellation, normally realized by time-invariant filters, works only for a specific listening location and the sound field can only be controlled in the sweet-spot.

A digital sound projector is an array of transducers or loudspeakers that is controlled such that audio input signals are emitted in a controlled fashion within a space in front of the array. Often, the sound is emitted as a beam, directed into an arbitrary direction within the half-space in front of the array. By making use of carefully chosen reflection paths from room features, a listener will perceive a sound beam emitted by the array as if originating from the location of its last reflection. If the last reflection happens in a rear corner, the listener will perceive the sound as if emitted from a source behind him or her. However, human perception also involves echo processing, so that second and higher reflections should have physical correspondence to environments to which the listener is accustomed, or the listener may sense distortion.

Thus, if one seeks a perception in a rectangular room that the sound is coming from the front left of the listener, the listener will expect a slightly delayed echo from behind, and a further second order reflection from another wall, each being acoustically colored by the properties of the reflective surfaces.

One application of digital sound projectors is to replace conventional discrete surround-sound systems, which typically employ several separate loudspeakers placed at different locations around a listener's position. The digital sound projector, by generating beams for each channel of the surround-sound audio signal, and steering the beams into the appropriate directions, creates a true surround-sound at the listener's position without the need for further loudspeakers or additional wiring. One such system is described in U.S. Patent Publication No. 2009/0161880 of Hooley, et al., the disclosure of which is incorporated herein by reference.

Cross-talk cancellation is in a sense the ultimate sound reproduction problem since an efficient cross-talk canceller gives one complete control over the sound field at a number of "target" positions. The objective of a cross-talk canceller is to reproduce a desired signal at a single target position while cancelling out the sound perfectly at all remaining target positions. The basic principle of cross-talk cancellation using only two loudspeakers and two target positions has been known for more than 30 years. Atal and Schroeder U.S. Pat. No. 3,236,949 (1966) used physical reasoning to determine how a cross-talk canceller comprising only two loudspeakers placed symmetrically in front of a single listener could work. In order to reproduce a short pulse at the left ear only, the left loudspeaker first emits a positive pulse. This pulse must be cancelled at the right ear by a slightly weaker negative pulse emitted by the right loudspeaker. This negative pulse must then be cancelled at the left ear by another even weaker positive pulse emitted by the left loudspeaker, and so on. Atal and Schroeder's model assumes free-field conditions. The influence of the listener's torso, head and outer ears on the incoming sound waves is ignored.

In order to control delivery of the binaural signals, or "target" signals, it is necessary to know how the listener's torso, head, and pinnae (outer ears) modify incoming sound waves as a function of the position of the sound source. This information can be obtained by making measurements on "dummy-heads" or human subjects. The results of such measurements are referred to as "head-related transfer functions", or HRTFs.

HRTFs vary significantly between listeners, particularly at high frequencies. The large statistical variation in HRTFs between listeners is one of the main problems with virtual source imaging over headphones. Headphones offer good control over the reproduced sound. There is no "cross-talk" (the sound does not wrap around the head to the opposite ear), and the acoustical environment does not modify the reproduced sound (room reflections do not interfere with the direct sound). Unfortunately, however, when headphones are used for the reproduction, the virtual image is often perceived as being too close to the head, and sometimes even inside the head. This phenomenon is particularly difficult to avoid when one attempts to place the virtual image directly in front of the listener. It appears to be necessary to compensate not only for the listener's own HRTFs, but also for the response of the headphones used for the reproduction. In addition, the whole sound stage moves with the listener's head (unless head-tracking and sound stage resynthesis is used, and this requires a significant amount of additional processing power). Spatialized Loudspeaker reproduction using linear transducer arrays, on the other hand, provides natural listening conditions but makes it necessary to compensate for cross-talk and also to consider the reflections from the acoustical environment.

The Comhear MyBeam™ line array employs Digital Signal Processing (DSP) on identical, equally spaced, individually powered and perfectly phase-aligned speaker elements in a linear array to produce constructive and destructive interference. See, U.S. Pat. No. 9,578,440. The speakers are intended to be placed in a linear array parallel to the inter-aural axis of the listener, in front of the listener.

Beamforming or spatial filtering is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the array. Adaptive beamforming is used to detect and estimate the signal of interest at the output of a sensor array by means of optimal (e.g., least-squares) spatial filtering and interference rejection.

The Mybeam™ speaker is active—it contains its own amplifiers and I/O and can be configured to include ambience monitoring for automatic level adjustment, and can adapt its beam forming focus to the distance of the listener, and operate in several distinct modalities, including binaural (transaural), single beam-forming optimized for speech and privacy, near field coverage, far field coverage, multiple listeners, etc. In binaural mode, operating in either near or far field coverage, Mybeam™ renders a normal PCM stereo music or video signal (compressed or uncompressed sources) with exceptional clarity, a very wide and detailed sound stage, excellent dynamic range, and communicates a strong sense of envelopment (the image musicality of the speaker is in part a result of sample-accurate phase alignment of the speaker array). Running at up to 96K sample rate, and 24-bit precision, the speakers reproduce Hi Res and HD audio with exceptional fidelity. When reproducing a PCM stereo signal of binaurally processed content, highly resolved 3D audio imaging is easily perceived. Height information as well as frontal 180-degree images are well-rendered and rear imaging is achieved for some sources. Reference form factors include 12 speaker, 10 speaker and 8 speaker versions, in widths of ca. 8 to 22 inches.

A spatialized sound reproduction system is disclosed in U.S. Pat. No. 5,862,227. This system employs z domain filters, and optimizes the coefficients of the filters $H_1(z)$ and $H_2(z)$ in order to minimize a cost function given by $J=E[e_1^2(n)+e_2^2(n)]$, where $E[\bullet]$ is the expectation operator, and $e_m(n)$ represents the error between the desired signal and the reproduced signal at positions near the head. The cost function may also have a term which penalizes the sum of the squared magnitudes of the filter coefficients used in the filters $H_1(z)$ and $H_2(z)$ in order to improve the conditioning of the inversion problem.

Another spatialized sound reproduction system is disclosed in U.S. Pat. No. 6,307,941. Exemplary embodiments may use, any combination of (i) FIR and/or IIR filters (digital or analog) and (ii) spatial shift signals (e.g., coefficients) generated using any of the following methods: raw impulse response acquisition; balanced model reduction; Hankel norm modeling; least square modeling; modified or unmodified Prony methods; minimum phase reconstruction; Iterative Pre-filtering; or Critical Band Smoothing.

U.S. Pat. No. 9,215,544 relates to sound spatialization with multichannel encoding for binaural reproduction on two loudspeakers. A summing process from multiple channels is used to define the left and right speaker signals.

U.S. Pat. No. 7,164,768 provides a directional channel audio signal processor.

U.S. Pat. No. 8,050,433 provides an apparatus and method for canceling crosstalk between two-channel speakers and two ears of a listener in a stereo sound generation system.

U.S. Pat. Nos. 9,197,977 and 9,154,896 relate to a method and apparatus for processing audio signals to create "4D" spatialized sound, using two or more speakers, with multiple-reflection modelling.

ISO/IEC FCD 23003-2:200x, Spatial Audio Object Coding (SAOC), Coding of Moving Pictures And Audio, ISO/IEC JTC 1/SC 29/WG 11N10843, July 2009, London, UK, discusses stereo downmix transcoding of audio streams from an MPEG audio format. The transcoding is done in two steps: In one step the object parameters (OLD, NRG, IOC, DMG, DCLD) from the SAOC bitstream are transcoded into spatial parameters (CLD, ICC, CPC, ADG) for the MPEG Surround bitstream according to the information of the rendering matrix. In the second step the object downmix is modified according to parameters that are derived from the object parameters and the rendering matrix to form a new downmix signal.

Calculations of signals and parameters are done per processing band m and parameter time slot l. The input signals to the transcoder are the stereo downmix denoted as $$X = x^{n,k} = \begin{pmatrix} l_0^{n,k} \\ r_0^{n,k} \end{pmatrix}.$$

The data that is available at the transcoder is the covariance matrix E, the rendering matrix $M_{ren}$, and the downmix matrix D. The covariance matrix E is an approximation of the original signal matrix multiplied with its complex conjugate transpose, $SS^* \approx E$, where $S = s^{n,k}$. The elements of the matrix E are obtained from the object OLDs and IOCs, $e_{ij} = \sqrt{OLD_i OLD_j} IOC_{ij}$, where $OLD_i^{l,m} = D_{OLD}(i,l,m)$ and $IOC_{ij}^{l,m} = D_{IOC}(i,j,l,m)$. The rendering matrix $M_{ren}$ of size 6×N determines the target rendering of the audio objects S through matrix multiplication $Y = y^{n,k} = M_{ren}S$. The downmix weight matrix D of size 2×N determines the downmix signal in the form of a matrix with two rows through the matrix multiplication X=DS.

The elements $d_{ij}$ (i=1, 2; j=0 . . . N−1) of the matrix are obtained from the dequantized DCLD and DMG parameters $$d_{1j} = 10^{0.05 DMG_j} \sqrt{\frac{10^{0.1 DCLD_j}}{1 + 10^{0.1 DCLD_j}}},$$

$$d_{2j} = 10^{0.05 DMG_j} \sqrt{\frac{1}{1 + 10^{0.1 DCLD_j}}},$$

where $DMG_j = D_{DMG}(j,l)$ and $D_{CLD} = D_{DCLD}(j,l)$.

The transcoder determines the parameters for the MPEG Surround decoder according to the target rendering as described by the rendering matrix $M_{ren}$. The six channel target covariance is denoted with F and given by $F = YY^* = M_{ren}S(M_{ren}S)^* = M_{ren}(SS^*)M_{ren}^* = M_{ren}EM_{ren}^*$. The transcoding process can conceptually be divided into two parts. In one part a three-channel rendering is performed to a left, right and center channel. In this stage the parameters for the downmix modification as well as the prediction parameters for the TTT box for the MPS decoder are obtained. In the other part the CLD and ICC parameters for the rendering between the front and surround channels (OTT parameters, left front—left surround, right front—right surround) are determined. The spatial parameters are determined that control the rendering to a left and right channel, consisting of front and surround signals. These parameters describe the prediction matrix of the TTT box for the MPS decoding $C_{TTT}$ (CPC parameters for the MPS decoder) and the downmix converter matrix G. $C_{TTT}$ is the prediction matrix to obtain the target rendering from the modified downmix $\hat{X} = GX$: $C_{TTT}\hat{X} = C_{TTT}GX \approx A_3S$. $A_3$ is a reduced rendering matrix of size 3×N, describing the rendering to the left, right and center channel, respectively. It is obtained as $A_3 = D_{36}M_{ren}$ with the 6 to 3 partial downmix matrix $D_{36}$ defined by $$D_{36} = \begin{bmatrix} w_1 & 0 & 0 & 0 & w_1 & 0 \\ 0 & w_2 & 0 & 0 & 0 & w_2 \\ 0 & 0 & w_3 & w_3 & 0 & 0 \end{bmatrix}.$$

The partial downmix weights $w_p$, p=1,2,3 are adjusted such that the energy of $w_p(y_{2p-1} + y_{2p})$ is equal to the sum of energies $\|y_{2p-1}\|^2 + \|y_{2p}\|^2$ up to a limit factor.

$$w_1 = \frac{f_{1,1} + f_{5,5}}{f_{1,1} + f_{5,5} + 2f_{1,5}},\ w_2 = \frac{f_{2,2} + f_{6,6}}{f_{2,2} + f_{6,6} + 2f_{2,6}},$$

$w_3 = 0.5$, where $f_{i,j}$ denote the elements of F. For the estimation of the desired prediction matrix $C_{TTT}$ and the downmix preprocessing matrix G we define a prediction matrix $C_3$ of size 3×2, that leads to the target rendering $C_3X \approx A_3S$. Such a matrix is derived by considering the normal equations $C_3(DED^*) \approx A_3ED^*$.

The solution to the normal equations yields the best possible waveform match for the target output given the object covariance model. G and $C_{TTT}$ are now obtained by solving the system of equations $C_{TTT}G = C_3$. To avoid numerical problems when calculating the term $J = (DED^*)^{-1}$, J is modified. First the eigenvalues $\lambda_{1,2}$ of J are calculated, solving $\det(J - \lambda_{1,2}I) = 0$. Eigenvalues are sorted in descending ($\lambda_1 \geq \lambda_2$) order and the eigenvector corresponding to the larger eigenvalue is calculated according to the equation above. It is assured to lie in the positive x-plane (first element has to be positive). The second eigenvector is obtained from the first by a −90 degrees rotation:

$$J = (v_1 v_2)\begin{pmatrix} \lambda_1 & 0 \\ 0 & \lambda_2 \end{pmatrix}(v_1 v_2)^*.$$

A weighting matrix $W = (D \cdot \mathrm{diag}(C_3))$ is computed from the downmix matrix D and the prediction matrix $C_3$. Since $C_{TTT}$ is a function of the MPEG Surround prediction parameters $c_1$ and $c_2$ (as defined in ISO/IEC 23003-1:2007), $C_{TTT}G = C_3$ is rewritten in the following way, to find the stationary point or points of the function, $$\Gamma\begin{pmatrix} \tilde{c}_1 \\ \tilde{c}_2 \end{pmatrix} = b,$$

with $\Gamma = (D_{TTT}C_3)W(D_{TTT}C_3)^*$ and $b = GWC_3v$, where $$D_{TTT} = \begin{pmatrix} 1 & 0 & 1 \\ 0 & 1 & 1 \end{pmatrix}$$

and $v = (1\ 1\ -1)$. If Γ does not provide a unique solution ($\det(\Gamma) < 10^{-3}$), the point is chosen that lies closest to the point resulting in a TTT pass through. As a first step, the row i of Γ is chosen $\gamma=[\gamma_{i,1}\ \gamma_{i,2}]$ where the elements contain most energy, thus $\gamma_{i,1}^2+\gamma_{i,2}^2 \geq \gamma_{j,1}^2+\gamma_{j,2}^2$, j=1,2. Then a solution is determined such that $$\begin{pmatrix}\tilde{c}_1\\ \tilde{c}_2\end{pmatrix}=\begin{pmatrix}1\\ 1\end{pmatrix}-3y \text{ with } y=\frac{b_{i,3}}{\left(\sum_{j=1,2}(\gamma_{i,j})^2\right)+\varepsilon}\gamma^T.$$

If the obtained solution for $\tilde{c}_1$ and $\tilde{c}_2$ is outside the allowed range for prediction coefficients that is defined as $-2 \leq \tilde{c}_j \leq 3$ (as defined in ISO/IEC 23003-1:2007), $\tilde{c}_j$ are calculated as follows. First define the set of points, $x_p$ as:

$$x_p \in \left\{\begin{matrix}\begin{pmatrix}\min\left(3,\max\left(-2,-\frac{-2\gamma_{12}-b_1}{\gamma_{11}+\varepsilon}\right)\right)\\ -2\end{pmatrix}, \begin{pmatrix}\min\left(3,\max\left(-2,-\frac{3\gamma_{12}-b_1}{\gamma_{11}+\varepsilon}\right)\right)\\ 3\end{pmatrix}\\ \begin{pmatrix}-2\\ \min\left(3,\max\left(-2,-\frac{-2\gamma_{21}-b_2}{\gamma_{22}+\varepsilon}\right)\right)\end{pmatrix}, \begin{pmatrix}3\\ \min\left(3,\max\left(-2,-\frac{3\gamma_{21}-b_2}{\gamma_{22}+\varepsilon}\right)\right)\end{pmatrix}\end{matrix}\right\},$$

and the distance function, $\text{distFunc}(x_p)=x_p^*\Gamma x_{p1}-2bx_p$.

Then the prediction parameters are defined according to:

$$\begin{pmatrix}\tilde{c}_1\\ \tilde{c}_2\end{pmatrix}=\arg\min_{x\in x_p}(distFunc(x)).$$

The prediction parameters are constrained according to: $c_1=(1-\lambda)\tilde{c}_1+\lambda\gamma_1$, $c_2=(1-\lambda)\tilde{c}_2+\lambda\gamma_2$, where λ, $\gamma_1$ and $\gamma_2$ are defined as $$\gamma_1=\frac{2f_{1,1}+2f_{5,5}-f_{3,3}+f_{1,3}+f_{5,3}}{2f_{1,1}+2f_{5,5}+2f_{3,3}+4f_{1,3}+4f_{5,3}},$$

$$\gamma_2=\frac{2f_{2,2}+2f_{6,6}-f_{3,3}+f_{2,3}+f_{6,3}}{2f_{2,2}+2f_{6,6}+2f_{3,3}+4f_{2,3}+4f_{6,3}},$$

$$\lambda=\left(\frac{(f_{1,2}+f_{1,6}+f_{5,2}+f_{5,6}+f_{1,3}+f_{5,3}+f_{2,3}+f_{6,3}+f_{3,3})^2}{(f_{1,1}+f_{5,5}+f_{3,3}+2f_{1,3}+2f_{5,3})(f_{2,2}+f_{6,6}+f_{3,3}+2f_{2,3}+2f_{6,3})}\right)^8.$$

For the MPS decoder, the CPCs are provided in the form $D_{CPC\_1}=c_1(l,m)$ and $D_{CPC\_2}=c_2(l,m)$ The parameters that determine the rendering between front and surround channels can be estimated directly from the target covariance matrix F $$CLD_{a,b}=10\log_{10}\left(\frac{f_{a,a}}{f_{b,b}}\right),\ ICC_{a,b}=\frac{f_{a,b}}{\sqrt{f_{a,a}f_{b,b}}},$$

with (a,b)=(1,2) and (3,4).

The MPS parameters are provided in the form $CLD_h^{l,m}=D_{CLD}(h,l,m)$ and $ICC_h^{l,m}=D_{ICC}(h,l,m)$, for every OTT box h.

The stereo downmix X is processed into the modified downmix signal $\hat{X}$: $\hat{X}=GX$: where $G=D_{TTT}C_3=D_{TTT}M_{ren}ED^*J$. The final stereo output from the SAOC transcoder $\hat{X}$ is produced by mixing X with a decorrelated signal component according to: $\hat{X}=G_{Mod}X+P_2X_d$, where the decorrelated signal $X_d$ is calculated as noted herein, and the mix matrices $G_{mod}$ and $P_2$ according to below.

First, define the render upmix error matrix as $R=A_{diff}EA_{diff}^*$, where $A_{diff}=D_{TTT}A_3-GD$, and moreover define the covariance matrix of the predicted signal $\hat{R}$ as $$\hat{R}=\begin{pmatrix}\hat{r}_{11} & \hat{r}_{12}\\ \hat{r}_{2l} & \hat{r}_{22}\end{pmatrix}=GDED^*G^*.$$

The gain vector $g_{vec}$ can subsequently be calculated as:

$$g_{vec}=\left(\min\left(\sqrt{\frac{\hat{r}_{11}+r_{11}+\varepsilon}{r_{11}+\varepsilon}},1.5\right)\min\left(\sqrt{\frac{\hat{r}_{22}+r_{22}+\varepsilon}{r_{22}+\varepsilon}},1.5\right)\right)$$

and the mix matrix $G_{mod}$ will be given as $$G_{Mod}=\begin{cases}\text{diag}(g_{vec})G, & r_{12}>0,\\ G, & \text{otherwise.}\end{cases}$$

Similarly, the mix matrix $P_2$ is given as:

$$P_2=\begin{cases}\begin{pmatrix}0 & 0\\ 0 & 0\end{pmatrix}, & r_{12}>0,\\ v_R\text{diag}(W_d), & \text{otherwise.}\end{cases}$$

To derive $v_R$ and $W_d$, the characteristic equation of R needs to be solved: $\det(R-\lambda_{1,2}I)=0$, giving the eigenvalues, $\lambda_1$ and $\lambda_2$. The corresponding eigenvectors $v_{R1}$ and $v_{R2}$ of R can be calculated solving the equation system: $(R-\lambda_{1,2}I)v_{R1,R2}=0$. Eigenvalues are sorted in descending ($\lambda_1 \geq \lambda_2$) order and the eigenvector corresponding to the larger eigenvalue is calculated according to the equation above. It is assured to lie in the positive x-plane (first element has to be positive). The second eigenvector is obtained from the first by a −90 degrees rotation:

$$R=(v_{R1}\,v_{R2})\begin{pmatrix}\lambda_1 & 0\\ 0 & \lambda_2\end{pmatrix}(v_{R1}\,v_{R2})^*.$$

Incorporating $P_1=(1\ 1)G$, $R_d$ can be calculated according to:

$$R_d=\begin{pmatrix}r_{d11} & r_{d12}\\ r_{d21} & r_{d22}\end{pmatrix}=\text{diag}(P_1(DED^*)P_1^*),$$

which gives $$\begin{cases}w_{d1}=\min\left(\sqrt{\frac{\lambda_1}{r_{d1}+\varepsilon}},2\right),\\ w_{d2}=\min\left(\sqrt{\frac{\lambda_2}{r_{d2}+\varepsilon}},2\right),\end{cases}$$

and finally, the mix matrix, $$P_2=(v_{R1}\,v_{R2})\begin{pmatrix}w_{d1} & 0\\ 0 & w_{d2}\end{pmatrix}.$$

The decorrelated signals $X_d$ are created from the decorrelator described in ISO/IEC 23003-1:2007. Hence, the decorrFunc( ) denotes the decorrelation process:

$$X_d = \begin{pmatrix} x_{1d} \\ x_{2d} \end{pmatrix} = \begin{pmatrix} decorrFunc((1\ \ 0)P_1X) \\ decorrFunc((0\ \ 1)P_1X) \end{pmatrix}.$$

The SAOC transcoder can let the mix matrices $P_1$, $P_2$ and the prediction matrix $C_3$ be calculated according to an alternative scheme for the upper frequency range. This alternative scheme is particularly useful for downmix signals where the upper frequency range is coded by a non-waveform preserving coding algorithm e.g., SBR in High Efficiency AAC. For the upper parameter bands, defined by bsTttBandsLow≤pb<numBands, $P_1$, $P_2$ and $C_3$ should be calculated according to the alternative scheme described below:

$$\begin{cases} P_1 = \begin{pmatrix} 0 & 0 \\ 0 & 0 \end{pmatrix}, \\ P_2 = G. \end{cases}$$

Define the energy downmix and energy target vectors, respectively:

$$\begin{cases} e_{dmx} = \begin{pmatrix} e_{dmx1} \\ e_{dmx2} \end{pmatrix} = \mathrm{diag}(DED^*) + \varepsilon I, \\ e_{tar} = \begin{pmatrix} e_{tar1} \\ e_{tar2} \\ e_{tar3} \end{pmatrix} = \mathrm{diag}(A_3EA_3^*), \end{cases}$$

and the help matrix $$T = \begin{pmatrix} t_{11} & t_{12} \\ t_{21} & t_{22} \\ t_{31} & t_{32} \end{pmatrix} = A_3D^* + \varepsilon I.$$

Then calculate the gain vector $$g = \begin{pmatrix} g_1 \\ g_2 \\ g_3 \end{pmatrix} = \begin{pmatrix} \sqrt{\dfrac{e_{tar1}}{t_{11}^2 e_{dmx1} + t_{12}^2 e_{dmx2}}} \\ \sqrt{\dfrac{e_{tar2}}{t_{21}^2 e_{dmx1} + t_{22}^2 d_{dmx2}}} \\ \sqrt{\dfrac{e_{tar3}}{t_{31}^2 e_{dmx1} + t_{32}^2 e_{dmx2}}} \end{pmatrix},$$

which finally gives the new prediction matrix $$C_3 = \begin{pmatrix} g_1t_{11} & g_1t_{12} \\ g_2t_{21} & g_2t_{22} \\ g_3t_{31} & g_3t_{32} \end{pmatrix}.$$

For the decoder mode of the SAOC system, the output signal of the downmix preprocessing unit (represented in the hybrid QMF domain) is fed into the corresponding synthesis filterbank as described in ISO/IEC 23003-1:2007 yielding the final output PCM signal. The downmix preprocessing incorporates the mono, stereo and, if required, subsequent binaural processing.

The output signal $\hat{X}$ is computed from the mono downmix signal X and the decorrelated mono downmix signal $X_d$ as $\hat{X}=GX+P_2X_d$. The decorrelated mono downmix signal $X_d$ is computed as $X_d$=decorrfunc(X). In case of binaural output the upmix parameters G and $P_2$ derived from the SAOC data, rendering information $M_{ren}^{l,m}$ and Head-Related Transfer Function (HRTF) parameters are applied to the downmix signal X (and $X_d$) yielding the binaural output $\hat{X}$. The target binaural rendering matrix $A^{l,m}$ of size 2×N consists of the elements $a_{x,y}^{l,m}$. Each element $a_{x,y}^{l,m}$ is derived from HRTF parameters and rendering matrix $M_{ren}^{l,m}$ with elements $m_{i,y}^{l,m}$. The target binaural rendering matrix $A^{l,m}$ represents the relation between all audio input objects y and the desired binaural output.

$$a_{1,y}^{l,m} = \sum_{i=0}^{N_{HRTF}-1} m_{i,y}^{l,m} P_{i,L}^m \exp\left(j\frac{\phi_i^m}{2}\right),$$

$$a_{2,y}^{l,m} = \sum_{i=0}^{N_{HRTF}-1} m_{i,y}^{l,m} P_{i,R}^m \exp\left(-j\frac{\phi_i^m}{2}\right).$$

The HRTF parameters are given by $P_{i,L}^m$, $P_{i,R}^m$ and $\phi_i^m$ for each processing band m. The spatial positions for which HRTF parameters are available are characterized by the index i. These parameters are described in ISO/IEC 23003-1:2007.

The upmix parameters $G^{l,m}$ and $P_2^{l,m}$ are computed as $$G^{l,m} = \begin{pmatrix} P_L^{l,m}\exp\left(+j\dfrac{\phi_C^{l,m}}{2}\right)\cos(\beta^{l,m}+\alpha^{l,m}) \\ P_R^{l,m}\exp\left(-j\dfrac{\phi_C^{l,m}}{2}\right)\cos(\beta^{l,m}-\alpha^{1,m}) \end{pmatrix}, \text{ and}$$

$$P_2^{l,m} = \begin{pmatrix} P_L^{l,m}\exp\left(+j\dfrac{\phi_C^{l,m}}{2}\right)\sin(\beta^{l,m}+\alpha^{l,m}) \\ P_R^{l,m}\exp\left(-j\dfrac{\phi_C^{l,m}}{2}\right)\sin(\beta^{l,m}-\alpha^{1,m}) \end{pmatrix}.$$

The gains $P_L^{l,m}$ and $P_R^{l,m}$ for the left and right output channels are $$P_L^{l,m} = \sqrt{\frac{f_{1,1}^{l,m}}{v^{l,m}}},$$

and $$P_R^{l,m} = \sqrt{\frac{f_{2,2}^{l,m}}{v^{l,m}}}.$$

The desired covariance matrix $F^{l,m}$ of size 2×2 with elements $f_{i,j}^{l,m}$ is given as $F^{l,m}=A^{l,m}E^{l,m}(A^{l,m})^*$. The scalar $v^{l,m}$ is computed as $v^{l,m}=D^lE^{l,m}(D^l)^*+\varepsilon$. The downmix matrix $D^l$ of size 1×N with elements $d_j^l$ can be found as $d_j^l=10^{0.05DMG_j^l}$.

The matrix $E^{l,m}$ with elements $e_{ij}^{l,m}$ are derived from the following relationship $e_{ij}^{l,m}=\sqrt{OLD_i^{l,m}OLD_j^{l,m}}\max(IOC_{ij}^{l,m}, 0)$. The inter channel phase difference $\phi_C^{l,m}$ is given as $$\phi_C^{l,m} = \begin{cases} \arg(f_{1,2}^{l,m}), & 0 \le m \le 11,\ \rho_C^{l,m} \ge 0.6, \\ 0, & \text{otherwise.} \end{cases}$$

The inter channel coherence $\rho_C^{l,m}$ is computed as $$\rho_C^{l,m} = \min\left(\frac{|f_{1,2}^{l,m}|}{\sqrt{f_{1,1}^{l,m} f_{2,2}^{l,m}}}, 1\right).$$

The rotation angles $\alpha^{l,m}$ and $\beta^{l,m}$ are given as $$\alpha^{l,m}=\begin{cases}\frac{1}{2}\arccos\left(\rho_C^{l,m}\cos\left(\arg\left(f_{1,2}^{l,m}\right)\right)\right), & 0\le m\le 11,\ \rho_C^{l,m}<0.6,\\ \frac{1}{2}\arccos\left(\rho_C^{l,m}\right), & \text{otherwise.}\end{cases}$$

$$\beta^{l,m}=\arctan\left(\tan\left(\alpha^{l,m}\right)\frac{P_R^{l,m}-P_L^{l,m}}{P_L^{l,m}+P_R^{l,m}+\varepsilon}\right).$$

In case of stereo output, the "x−1−b" processing mode can be applied without using HRTF information. This can be done by deriving all elements $a_{x,y}^{l,m}$ of the rendering matrix A, yielding: $a_{1,y}^{l,m}=m_{Lf,y}^{l,m}$, $a_{2,y}^{l,m}=m_{Rf,y}^{l,m}$. In case of mono output the "x−1−2" processing mode can be applied with the following entries: $a_{1,y}^{l,m}=m_{C,y}^{l,m}$, $a_{2,y}^{l,m}=0$.

In a stereo to binaural "x−2−b" processing mode, the upmix parameters $G^{l,m}$ and $P_2^{l,m}$ are computed as $$G^{l,m}=$$

$$\begin{pmatrix}P_L^{l,m,1}\exp\left(+j\frac{\phi^{l,m,1}}{2}\right)\cos\left(\beta^{l,m}+\alpha^{l,m}\right) & P_L^{l,m,2}\exp\left(+j\frac{\phi^{l,m,2}}{2}\right)\cos\left(\beta^{l,m}+\alpha^{l,m}\right)\\ P_R^{l,m,1}\exp\left(-j\frac{\phi^{l,m,1}}{2}\right)\cos\left(\beta^{l,m}-\alpha^{l,m}\right) & P_R^{l,m,2}\exp\left(-j\frac{\phi^{l,m,2}}{2}\right)\cos\left(\beta^{l,m}-\alpha^{l,m}\right)\end{pmatrix},$$

$$P_2^{l,m}=\begin{pmatrix}P_L^{l,m}\exp\left(+j\frac{\arg\left(c_{12}^{l,m}\right)}{2}\right)\sin\left(\beta^{l,m}+\alpha^{l,m}\right)\\ P_R^{l,m}\exp\left(-j\frac{\arg\left(c_{12}^{l,m}\right)}{2}\right)\sin\left(\beta^{l,m}-\alpha^{l,m}\right)\end{pmatrix}.$$

The corresponding gains $P_L^{l,m,x}$, $P_R^{l,m,x}$, and $P_L^{l,m}$, $P_R^{l,m}$ for the left and right output channels are $$P_L^{l,m,x}=\sqrt{\frac{f_{1,1}^{l,m,x}}{v^{l,m,x}}},\ P_R^{l,m,x}=\sqrt{\frac{f_{2,2}^{l,m,x}}{v^{l,m,x}}},\ P_L^{l,m}=\sqrt{\frac{c_{1,1}^{l,m}}{v^{l,m}}},\ P_R^{l,m}=\sqrt{\frac{c_{2,2}^{l,m}}{v^{l,m}}}.$$

The desired covariance matrix $F^{l,m,x}$ of size 2×2 with elements $f_{u,v}^{l,m,x}$ is given as $F^{l,m,x}=A^{l,m}E^{l,m,x}(A^{l,m})^*$. The covariance matrix $C^{l,m}$ of size 2×2 with elements $c_{u,v}^{l,m}$ of the dry binaural signal is estimated as $C^{l,m}=\tilde{G}^{l,m}D^lE^{l,m}(D)^*(\tilde{G}^{l,m})^*$, where $$\tilde{G}^{l,m}=\begin{pmatrix}P_L^{l,m,1}\exp\left(+j\frac{\phi^{l,m,1}}{2}\right) & P_L^{l,m,2}\exp\left(+j\frac{\phi^{l,m,2}}{2}\right)\\ P_R^{l,m,1}\exp\left(-j\frac{\phi^{l,m,1}}{2}\right) & P_R^{l,m,2}\exp\left(-j\frac{\phi^{l,m,2}}{2}\right)\end{pmatrix}.$$

The corresponding scalars $v^{l,m,x}$ and $v^{l,m}$ are computed as $v^{l,m,x}=D^{l,x}E^{l,m}(D^{l,x})^*+\varepsilon$, $v^{l,m}=(D^{l,1}+D^{l,2})E^{l,m}(D^{l,1}+D^{l,2})^*+\varepsilon$.

The downmix matrix $D^{l,x}$ of size 1×N with elements $d_i^{l,x}$ can be found as $$d_i^{l,1}=10^{0.05DMG_i^l}\sqrt{\frac{10^{0.1DCLD_i^l}}{1+10^{0.1DCLD_i^l}}},\quad d_i^{l,2}=10^{0.05DMG_i^l}\sqrt{\frac{1}{1+10^{0.1DCLD_i^l}}}.$$

The stereo downmix matrix $D^l$ of size 2×N with elements $d_{x,i}^l$ can be found as $d_{x,i}^l=d_i^{l,x}$.

The matrix $E^{l,m,x}$ with elements $e_{ij}^{l,m,x}$ are derived from the following relationship $$e_{ij}^{l,m,x}=e_{ij}^{l,m}\left(\frac{d_i^{l,x}}{d_i^{l,1}+d_i^{l,2}}\right)\left(\frac{d_j^{l,x}}{d_j^{l,1}+d_j^{l,2}}\right).$$

The matrix $E^{l,m}$ with elements $e_{ij}^{l,m}$ are given as $e_{ij}^{l,m}=\sqrt{OLD_i^{l,m}OLD_j^{l,m}}\max(IOC_{ij}^{l,m},0)$.

The inter channel phase differences $\phi_C^{l,m}$ are given as $$\phi^{l,m,x}=\begin{cases}\arg\left(f_{1,2}^{l,m,x}\right), & 0\le m\le 11,\ \rho_C^{l,m}>0.6,\\ 0, & \text{otherwise.}\end{cases}$$

The ICCs $\rho_C^{l,m}$ and $\rho_T^{l,m}$ are computed as $$\rho_T^{l,m}=\min\left(\frac{\left|f_{1,2}^{l,m}\right|}{\sqrt{f_{1,1}^{l,m}f_{2,2}^{l,m}}},1\right),$$

$$\rho_C^{l,m}=\min\left(\frac{\left|c_{12}^{l,m}\right|}{\sqrt{c_{11}^{l,m}-c_{22}^{l,m}}},1\right).$$

The rotation angles $\alpha^{l,m}$ and $\beta^{l,m}$ are given as $$\alpha^{l,m}=\frac{1}{2}\left(\arccos\left(\rho_T^{l,m}\right)-\arccos\left(\rho_C^{l,m}\right)\right),$$

$$\beta^{l,m}=\arctan\left(\tan\left(\alpha^{l,m}\right)\frac{P_R^{l,m}-P_L^{l,m}}{P_L^{l,m}+P_R^{l,m}}\right).$$

In case of stereo output, the stereo preprocessing is directly applied as described above. In case of mono output, the MPEG SAOC system the stereo preprocessing is applied with a single active rendering matrix entry $M_{ren}^{l,m}=(m_{0,Lf}^{l,m},\ldots,m_{N-1,Lf}^{l,m})$.

The audio signals are defined for every time slot n and every hybrid subband k. The corresponding SAOC parameters are defined for each parameter time slot l and processing band m. The subsequent mapping between the hybrid and parameter domain is specified by Table A.31, ISO/IEC 23003-1:2007. Hence, all calculations are performed with respect to the certain time/band indices and the corresponding dimensionalities are implied for each introduced variable. The OTN/TTN upmix process is represented either by matrix M for the prediction mode or $M_{Energy}$ for the energy mode. In the first case M is the product of two matrices exploiting the downmix information and the CPCs for each EAO channel. It is expressed in "parameter-domain" by $M=A\tilde{D}^{-1}C$, where $\tilde{D}^{-1}$ is the inverse of the extended downmix matrix $\tilde{D}$ and C implies the CPCs. The coefficients $m_j$ and $n_j$ of the extended downmix matrix $\tilde{D}$ denote the downmix values for every EAO j for the right and left downmix channel as $m_j=d_{1,EAO(j)}$, $n_j=d_{2,EAO(j)}$.

In case of a stereo, the extended downmix matrix $\tilde{D}$ is $$\tilde{D}=\left(\begin{array}{cc|ccc}1 & 0 & m_0 & \cdots & m_{N_{EAO}-1}\\ 0 & 1 & n_0 & \cdots & n_{N_{EAO}-1}\\ \hline m_0 & n_0 & -1 & \cdots & 0\\ \vdots & \vdots & 0 & \ddots & \vdots\\ m_{N_{EAO}-1} & n_{N_{EAO}-1} & 0 & \cdots & -1\end{array}\right),$$

and for a mono, it becomes $$\tilde{D}=\left(\begin{array}{c|ccc} 1 & m_0 & \dots & m_{N_{EAO}-1} \\ 1 & n_0 & \dots & n_{N_{EAO}-1} \\ \hline m_0+n_0 & -1 & \dots & 0 \\ \vdots & 0 & \ddots & \vdots \\ m_{N_{EAO}-1}+n_{N_{EAO}-1} & 0 & \dots & -1 \end{array}\right).$$

With a stereo downmix, each EAO j holds two CPCs $c_{j,0}$ and $c_{j,1}$ yielding matrix C $$C=\left(\begin{array}{cc|ccc} 1 & 0 & 0 & \cdots & 0 \\ 0 & 1 & 0 & \cdots & 0 \\ \hline c_{0,0} & c_{0,1} & 1 & \cdots & 0 \\ \vdots & \vdots & \vdots & \ddots & \vdots \\ c_{N_{EAO}-1,0} & c_{N_{EAO}-1,1} & 0 & \cdots & 1 \end{array}\right).$$

The CPCs are derived from the transmitted SAOC parameters, i.e., the OLDs, IOCs, DMGs and DCLDs. For one specific EAO channel j=0 . . . $N_{EAO}-1$ the CPCs can be estimated by $$\tilde{c}_{j,0}=\frac{P_{LoCo,j}P_{Ro}-P_{RoCo,j}P_{LoRo}}{P_{Lo}P_{Ro}-P_{LoRo}^2},$$

$$\tilde{c}_{j,1}=\frac{P_{RoCo,j}P_{Lo}-P_{LoCo,j}P_{LoRo}}{P_{Lo}P_{Ro}-P_{LoRo}^2}.$$

In the following description of the energy quantities $P_{Lo}$, $P_{Ro}$, $P_{LoRo}$, $P_{LoCo,j}$ and $P_{RoCo,j}$.

$$P_{Lo}=OLD_L+\sum_{j=0}^{N_{EAO}-1}\sum_{k=0}^{N_{EAO}-1}m_j m_k e_{j,k},$$

$$P_{Ro}=OLD_R+\sum_{j=0}^{N_{EAO}-1}\sum_{k=0}^{N_{EAO}-1}n_j n_k e_{j,k},$$

$$P_{LoRo}=e_{L,R}+\sum_{j=0}^{N_{EAO}-1}\sum_{k=0}^{N_{EAO}-1}m_j n_k e_{j,k},$$

$$P_{LoCo,j}=m_jOLD_L+n_je_{L,R}-m_jOLD_j-\sum_{\substack{i=0\\ i\neq j}}^{N_{EAO}-1}m_ie_{i,j},$$

$$P_{RoCo,j}=n_jOLD_R+m_je_{L,R}-n_jOLD_j-\sum_{\substack{i=0\\ i\neq j}}^{N_{EAO}-1}n_ie_{i,j}.$$

The parameters $OLD_L$, $OLD_R$ and $IOC_{LR}$ correspond to the regular objects and can be derived using downmix information:

$$OLD_L=\sum_{i=0}^{N-N_{EAO}-1}d_{0,i}^2OLD_i,\quad OLD_R=\sum_{i=0}^{N-N_{EAO}-1}d_{1,i}^2OLD_i,$$

$$IOC_{LR}=\begin{cases} IOC_{0,1}, & N-N_{EAO}=2,\\ 0, & \text{otherwise.}\end{cases}$$

The CPCs are constrained by the subsequent limiting functions:

$$\gamma_{j,1}=\frac{m_jOLD_L+n_je_{L,R}-\sum_{i=0}^{N_{EAO}-1}m_ie_{i,j}}{2\left(OLD_L+\sum_{i=0}^{N_{EAO}-1}\sum_{k=0}^{N_{EAO}-1}m_im_ke_{i,k}\right)},$$

$$\gamma_{j,2}=\frac{n_jOLD_R+m_je_{L,R}-\sum_{i=0}^{N_{EAO}-1}n_ie_{i,j}}{2\left(OLD_R+\sum_{i=0}^{N_{EAO}-1}\sum_{k=0}^{N_{EAO}-1}n_in_ke_{i,k}\right)}.$$

With the weighting factor $$\lambda=\left(\frac{P_{LoRo}^2}{P_{Lo}P_{Ro}}\right)^8.$$

The constrained CPCs become $c_{j,0}=(1-\lambda)\tilde{c}_{j,0}+\lambda\gamma_{j,0}$, $c_{j,1}=(1-\lambda)\tilde{c}_{j,1}+\lambda\gamma_{j,1}$.

The output of the TTN element yields $$Y=\left(\begin{array}{c} y_L \\ y_R \\ \hline y_{0,EAO} \\ \vdots \\ y_{N_{EAO}-1,EAO} \end{array}\right)=MX=A\tilde{D}^{-1}C\left(\begin{array}{c} l_0 \\ r_0 \\ \hline res_0 \\ \vdots \\ res_{N_{EAO}-1} \end{array}\right),$$

where X represents the input signal to the SAOC decoder/transcoder.

In case of a stereo, the extended downmix matrix $\tilde{D}$ matrix is $$\tilde{D}=\left(\begin{array}{cc|ccc} 1 & 1 & m_0 & \dots & m_{N_{EAO}-1} \\ \hline m_0/2 & m_0/2 & -1 & \dots & 0 \\ \vdots & \vdots & 0 & \ddots & \vdots \\ m_{N_{EAO}-1}/2 & m_{N_{EAO}-1}/2 & 0 & \dots & -1 \end{array}\right),$$

and for a mono, it becomes $$\tilde{D}=\left(\begin{array}{c|ccc} 1 & m_0 & \cdots & m_{N_{EAO}-1} \\ \hline m_0 & -1 & \dots & 0 \\ \vdots & 0 & \ddots & \vdots \\ m_{N_{EAO}-1} & 0 & \dots & -1 \end{array}\right).$$

With a mono downmix, one EAO j is predicted by only one coefficient $c_j$ yielding $$C=\left(\begin{array}{c|ccc} 1 & 0 & \cdots & 0 \\ \hline c_0 & 1 & \dots & 0 \\ \vdots & 0 & \ddots & \vdots \\ c_{N_{EAO}-1} & 0 & \dots & 1 \end{array}\right).$$

All matrix elements $c_j$ are obtained from the SAOC parameters according to the relationships provided above. For the mono downmix case the output signal Y of the OTN element yields $$Y = M\begin{pmatrix} d_0 \\ \hline res_0 \\ \vdots \\ res_{N_{EAO}-1} \end{pmatrix}.$$

In case of a stereo, the matrix $M_{Energy}$ are obtained from the corresponding OLDs according to $$M_{Energy} = A\begin{pmatrix} \sqrt{\frac{OLD_L}{OLD_L + \sum_{i=0}^{N_{EAO}-1} m_i^2 OLD_i}} & 0 \\ 0 & \sqrt{\frac{OLD_R}{OLD_R + \sum_{i=0}^{N_{EAO}-1} n_i^2 OLD_i}} \\ \hline \sqrt{\frac{m_0^2 OLD_0}{OLD_L + \sum_{i=0}^{N_{EAO}-1} m_i^2 OLD_i}} & \sqrt{\frac{n_0^2 OLD_0}{OLD_R + \sum_{i=0}^{N_{EAO}-1} n_i^2 OLD_i}} \\ \vdots & \vdots \\ \sqrt{\frac{m_{N_{EAO}-1}^2 OLD_{N_{EAO}-1}}{OLD_L + \sum_{i=0}^{N_{EAO}-1} m_i^2 OLD_i}} & \sqrt{\frac{n_{N_{EAO}-1}^2 OLD_{N_{EAO}-1}}{OLD_R + \sum_{i=0}^{N_{EAO}-1} n_i^2 OLD_i}} \end{pmatrix}.$$

The output of the TTN element yields $$Y = \begin{pmatrix} y_L \\ y_R \\ \hline y_{0,EAO} \\ \vdots \\ y_{N_{EAO}-1,EAO} \end{pmatrix} = M_{Energy}X = M_{Energy}\begin{pmatrix} l_0 \\ r_0 \end{pmatrix}.$$

The adaptation of the equations for the mono signal results in $$M_{Energy} = A\begin{pmatrix} \sqrt{\frac{OLD_L}{OLD_L + \sum_{i=0}^{N_{EAO}-1} m_i^2 OLD_i}} & \sqrt{\frac{OLD_L}{OLD_L + \sum_{i=0}^{N_{EAO}-1} m_i^2 OLD_i}} \\ \hline \sqrt{\frac{m_0^2 OLD_0}{OLD_L + \sum_{i=0}^{N_{EAO}-1} m_i^2 OLD_i}} & \sqrt{\frac{n_0^2 OLD_0}{OLD_L + \sum_{i=0}^{N_{EAO}-1} n_i^2 OLD_i}} \\ \vdots & \vdots \\ \sqrt{\frac{m_{N_{EAO}-1}^2 OLD_{N_{EAO}-1}}{OLD_L + \sum_{i=0}^{N_{EAO}-1} m_i^2 OLD_i}} & \sqrt{\frac{n_{N_{EAO}-1}^2 OLD_{N_{EAO}-1}}{OLD_L + \sum_{i=0}^{N_{EAO}-1} n_i^2 OLD_i}} \end{pmatrix},$$

The output of the TTN element yields $$Y = \begin{pmatrix} y_L \\ \hline y_{0,EAO} \\ \vdots \\ y_{N_{EAO}-1,EAO} \end{pmatrix} = M_{Energy}X = M_{Energy}\begin{pmatrix} l_0 \\ r_0 \end{pmatrix}.$$

The corresponding OTN matrix $M_{Energy}$ for the stereo case can be derived as $$M_{Energy} = A\left(\frac{1}{\sqrt{OLD_L + \sum_{i=0}^{N_{EAO}-1} m_i^2 OLD_i}} + \frac{1}{\sqrt{OLD_R + \sum_{i=0}^{N_{EAO}-1} n_i^2 OLD_i}}\right)\begin{pmatrix} \sqrt{OLD_L} \\ \sqrt{OLD_R} \\ \hline \sqrt{m_0^2 OLD_0} + \sqrt{n_0^2 OLD_0} \\ \vdots \\ \sqrt{m_{N_{EAO}-1}^2 OLD_{N_{EAO}-1}} + \sqrt{n_{N_{EAO}-1}^2 OLD_{N_{EAO}-1}} \end{pmatrix},$$

hence the output signal Y of the OTN element yields $Y=M_{Energy}d_0$.

For the mono case the OTN matrix $M_{Energy}$ reduces to $$M_{Energy} = A\frac{1}{\sqrt{OLD_L + \sum_{i=0}^{N_{EAO}-1} m_i^2 OLD_i}}\begin{pmatrix} \sqrt{OLD_L} \\ \hline \sqrt{m_0^2 OLD_0} \\ \vdots \\ \sqrt{m_{N_{EAO}-1}^2 OLD_{N_{EAO}-1}} \end{pmatrix}.$$

Julius O. Smith III, Physical Audio Signal Processing For Virtual Musical Instruments And Audio Effects, Center for Computer Research in Music and Acoustics (CCRMA), Department of Music, Stanford University, Stanford, California 94305 USA, December 2008 Edition (Beta), considers the requirements for acoustically simulating a concert hall or other listening space. Suppose we only need the response at one or more discrete listening points in space ("ears") due to one or more discrete point sources of acoustic energy. The direct signal propagating from a sound source to a listener's ear can be simulated using a single delay line in series with an attenuation scaling or lowpass filter. Each sound ray arriving at the listening point via one or more reflections can be simulated using a delay-line and some scale factor (or filter). Two rays create a feedforward comb filter. More generally, a tapped delay line FIR filter can simulate many reflections. Each tap brings out one echo at the appropriate delay and gain, and each tap can be independently filtered to simulate air absorption and lossy reflections. In principle, tapped delay lines can accurately simulate any reverberant environment, because reverberation really does consist of many paths of acoustic propagation from each source to each listening point. Tapped delay lines are expensive computationally relative to other techniques, and handle only one "point to point" transfer function, i.e., from one point-source to one ear, and are dependent on the physical environment. In general, the filters should also include filtering by the pinnae of the ears, so that each echo can be perceived as coming from the correct angle of arrival in 3D space; in other words, at least some reverberant reflections should be spatialized so that they appear to come from their natural directions in 3D space. Again, the filters change if anything changes in the listening space, including source or listener position. The basic architecture provides a set of signals, $s_1(n)$, $s_2(n)$, $s_3(n)$, . . . that feed set of filters $(h_{11}, h_{12}, h_{13})$, $(h_{21}, h_{22}, h_{23})$, . . . which are then summed to form composite signals $y_1(n)$, $y_2(n)$, representing signals for two ears. Each filter $h_{ij}$ can be implemented as a tapped delay line FIR filter. In the frequency domain, it is convenient to express the input-output relationship in terms of the transfer function matrix:

$$\begin{bmatrix} Y_1(z) \\ Y_2(z) \end{bmatrix} = \begin{bmatrix} H_{11}(z) & H_{12}(z) & H_{13}(z) \\ H_{21}(z) & H_{22}(z) & H_{23}(z) \end{bmatrix} \begin{bmatrix} S_1(z) \\ S_2(z) \\ S_3(z) \end{bmatrix}$$

Denoting the impulse response of the filter from source j to ear i by $h_{ij}(n)$, the two output signals are computed by six convolutions:

$$y_i(n) = \sum_{j-1}^{3} s_j * h_{ij}(n) = \sum_{j=1}^{3}\sum_{m=0}^{M_{ij}} s_j(m)h_{ij}(n-m),\ i = 1, 2,$$

where $M_{ij}$ denotes the order of FIR filter $h_{ij}$. Since many of the filter coefficients $h_{ij}(n)$ are zero (at least for small n), it is more efficient to implement them as tapped delay lines so that the inner sum becomes sparse. For greater accuracy, each tap may include a lowpass filter which models air absorption and/or spherical spreading loss. For large n, the impulse responses are not sparse, and must either be implemented as very expensive FIR filters, or limited to approximation of the tail of the impulse response using less expensive IIR filters.

For music, a typical reverberation time is on the order of one second. Suppose we choose exactly one second for the reverberation time. At an audio sampling rate of 50 kHz, each filter requires 50,000 multiplies and additions per sample, or 2.5 billion multiply-adds per second. Handling three sources and two listening points (ears), we reach 30 billion operations per second for the reverberator. While these numbers can be improved using FFT convolution instead of direct convolution (at the price of introducing a throughput delay which can be a problem for real-time systems), it remains the case that exact implementation of all relevant point-to-point transfer functions in a reverberant space is very expensive computationally.

While a tapped delay line FIR filter can provide an accurate model for any point-to-point transfer function in a reverberant environment, it is rarely used for this purpose in practice because of the extremely high computational expense. While there are specialized commercial products that implement reverberation via direct convolution of the input signal with the impulse response, the great majority of artificial reverberation systems use other methods to synthesize the late reverb more economically.

One disadvantage of the point-to-point transfer function model is that some or all of the filters must change when anything moves. If instead the computational model was of the whole acoustic space, sources and listeners could be moved as desired without affecting the underlying room simulation. Furthermore, we could use "virtual dummy heads" as listeners, complete with pinnae filters, so that all of the 3D directional aspects of reverberation could be captured in two extracted signals for the ears. Thus, there are compelling reasons to consider a full 3D model of a desired acoustic listening space. Let us briefly estimate the computational requirements of a "brute force" acoustic simulation of a room. It is generally accepted that audio signals require a 20 kHz bandwidth. Since sound travels at about a foot per millisecond, a 20 kHz sinusoid has a wavelength on the order of 1/20 feet, or about half an inch. Since, by elementary sampling theory, we must sample faster than twice the highest frequency present in the signal, we need "grid points" in our simulation separated by a quarter inch or less. At this grid density, simulating an ordinary 12'×12'×8' room in a home requires more than 100 million grid points. Using finite-difference or waveguide-mesh techniques, the average grid point can be implemented as a multiply-free computation; however, since it has waves coming and going in six spatial directions, it requires on the order of 10 additions per sample. Thus, running such a room simulator at an audio sampling rate of 50 kHz requires on the order of 50 billion additions per second, which is comparable to the three-source, two-ear simulation.

Based on limits of perception, the impulse response of a reverberant room can be divided into two segments. The first segment, called the early reflections, consists of the relatively sparse first echoes in the impulse response. The remainder, called the late reverberation, is so densely populated with echoes that it is best to characterize the response statistically in some way. Similarly, the frequency response of a reverberant room can be divided into two segments. The low-frequency interval consists of a relatively sparse distribution of resonant modes, while at higher frequencies the modes are packed so densely that they are best characterized statistically as a random frequency response with certain (regular) statistical properties. The early reflections are a particular target of spatialization filters, so that the echoes come from the right directions in 3D space. It is known that the early reflections have a strong influence on spatial impression, i.e., the listener's perception of the listening-space shape.

A lossless prototype reverberator has all of its poles on the unit circle in the plane, and its reverberation time is infinity. To set the reverberation time to a desired value, we need to move the poles slightly inside the unit circle. Furthermore, we want the high-frequency poles to be more damped than the low-frequency poles. This type of transformation can be obtained using the substitution $z^{-}\leftarrow G(z)z^{-1}$, where G(z) denotes the filtering per sample in the propagation medium (a lowpass filter with gain not exceeding 1 at all frequencies). Thus, to set the reverberation time in an feedback delay network (FDN), we need to find the G(z) which moves the poles where desired, and then design lowpass filters $H_i(z)\approx G^{M_i}(z)$ which will be placed at the output (or input) of each delay line. All pole radii in the reverberator should vary smoothly with frequency.

Let $t_{60}$ (ω) denote the desired reverberation time at radian frequency ω, and let $H_i(z)$ denote the transfer function of the lowpass filter to be placed in series with delay line i. The problem we consider now is how to design these filters to yield the desired reverberation time. We will specify an ideal amplitude response for $H_i(z)$ based on the desired reverberation time at each frequency, and then use conventional filter-design methods to obtain a low-order approximation to this ideal specification. Since losses will be introduced by the substitution $z^{-1}\leftarrow G(z)z^{-1}$, we need to find its effect on the pole radii of the lossless prototype. Let $p_i \triangleq e^{j\omega_i T}$ denote the $i^{th}$ pole. (Recall that all poles of the lossless prototype are on the unit circle.) If the per-sample loss filter G(z) were zero phase, then the substitution $z^{-1}\leftarrow G(z)z^{-1}$ would only affect the radius of the poles and not their angles. If the magnitude e response of G(z) is close to 1 along the unit circle, then we have the approximation that the $i^{th}$ pole moves from $z=e^{j\omega_i T}$ to $p_i=R_i e^{j\omega_i T}$, where $R_i=G(R_i e^{j\omega_i T})\approx G(e^{j\omega_i T})$.

In other words, when $z^{-1}$ is replaced by $G(z)z^{-1}$, where G(z) is zero phase and $|G(e^{j\omega})|$ is close to (but less than) 1, a pole originally on the unit circle at frequency $\omega_i$ moves approximately along a radial line in the complex plane to the point at radius $R_i\approx G(e^{j\omega_i T})$. The radius we desire for a pole at frequency $\omega_i$ is that which gives us the desired $t_{60}(\omega_i)$: $R_i^{t_{60}(\omega_i)/T}=0.001$. Thus, the ideal per-sample filter G(z) satisfies $|G(\omega)|^{t_{60}(\omega_i)/T}=0.001$.

The lowpass filter in series with a length $M_i$ delay line should therefore approximate $H_i(z)=G^{M_i}(z)$, which implies $$|H_i(e^{j\omega T})|^{\frac{t_{60}\omega}{M_i T}} = 0.001.$$

Taking 20 $\log_{10}$ of both sides gives $$20\log_{10}|H_i(e^{j\omega T})| = -60\frac{M_i T}{t_{60}(\omega)}.$$

Now that we have specified the ideal delay-line filter $H_i(e^{j\omega T})$, any number of filter-design methods can be used to find a low-order $H_i(z)$ which provides a good approximation. Examples include the functions invfreqz and stmcb in Matlab. Since the variation in reverberation time is typically very smooth with respect to ω, the filters $H_i(z)$ can be very low order.

The early reflections should be spatialized by including a head-related transfer function (HRTF) on each tap of the early-reflection delay line. Some kind of spatialization may be needed also for the late reverberation. A true diffuse field consists of a sum of plane waves traveling in all directions in 3D space. Spatialization may also be applied to late reflections, though since these are treated statistically, the implementation is distinct.

See also, U.S. Pat. Nos. 10,499,153; 9,361,896; 9,173,032; 9,042,565; 8,880,413; 7,792,674; 7,532,734; 7,379,961; 7,167,566; 6,961,439; 6,694,033; 6,668,061; 6,442,277; 6,185,152; 6,009,396; 5,943,427; 5,987,142; 5,841,879; 5,661,812; 5,465,302; 5,459,790; 5,272,757; 20010031051; 20020150254; 20020196947; 20030059070; 20040141622; 20040223620; 20050114121; 20050135643; 20050271212; 20060045275; 20060056639; 20070109977; 20070286427; 20070294061; 20080004866; 20080025534; 20080137870; 20080144794; 20080304670; 20080306720; 20090046864; 20090060236; 20090067636; 20090116652; 20090232317; 20090292544; 20100183159; 20100198601; 20100241439; 20100296678; 20100305952; 20110009771; 20110268281; 20110299707; 20120093348; 20120121113; 20120162362; 20120213375; 20120314878; 20130046790; 20130163766; 20140016793; 20140064526; 20150036827; 20150131824; 20160014540; 20160050508; 20170070835; 20170215018; 20170318407; 20180091921; 20180217804; 20180288554; 20180288554; 20190045317; 20190116448; 20190132674; 20190166426; 20190268711; 20190289417; 20190320282; WO 00/19415; WO 99/49574; and WO 97/30566.

Naef, Martin, Oliver Staadt, and Markus Gross. "Spatialized audio rendering for immersive virtual environments." In Proceedings of the ACM symposium on Virtual reality software and technology, pp. 65-72. ACM, 2002 discloses feedback from a graphics processor unit to perform spatialized audio signal processing. Lauterbach, Christian, Anish Chandak, and Dinesh Manocha. "Interactive sound rendering in complex and dynamic scenes using frustum tracing." IEEE Transactions on Visualization and Computer Graphics 13, no. 6 (2007): 1672-1679 also employs graphics-style analysis for audio processing. Murphy, David, and Flaithrí Neff. "Spatial sound for computer games and virtual reality." In Game sound technology and player interaction: Concepts and developments, pp. 287-312. IGI Global, 2011 discusses spatialized audio in a computer game and VR context. Begault, Durand R., and Leonard J. Trejo. "3-D sound for virtual reality and multimedia." (2000), NASA/TM-2000-209606 discusses various implementations of spatialized audio systems. See also, Begault, Durand, Elizabeth M. Wenzel, Martine Godfroy, Joel D. Miller, and Mark R. Anderson. "Applying spatial audio to human interfaces: 25 years of NASA experience." In Audio Engineering Society Conference: 40th International Conference: Spatial Audio: Sense the Sound of Space. Audio Engineering Society, 2010.

Herder, Jens. "Optimization of sound spatialization resource management through clustering." In The Journal of Three Dimensional Images, 3D-Forum Society, vol. 13, no. 3, pp. 59-65. 1999 relates to algorithms for simplifying spatial audio processing.

Verron, Charles, Mitsuko Aramaki, Richard Kronland-Martinet, and Grégory Pallone. "A 3-D immersive synthesizer for environmental sounds." IEEE Transactions on Audio, Speech, and Language Processing 18, no. 6 (2009): 1550-1561 relates to spatialized sound synthesis.

Malham, David G., and Anthony Myatt. "3-D sound spatialization using ambisonic techniques." Computer music journal 19, no. 4 (1995): 58-70 discusses use of ambisonic techniques (use of 3D sound fields). See also, Hollerweger, Florian. Periphonic sound spatialization in multi-user virtual environments. Institute of Electronic Music and Acoustics (IEM), Center for Research in Electronic Art Technology (CREATE) Ph.D dissertation 2006.

McGee, Ryan, and Matthew Wright. "Sound Element Spatializer." In ICMC. 2011; and McGee, Ryan, "Sound Element Spatializer." (M. S. Thesis, U. California Santa Barbara 2010), presents Sound Element Spatializer (SES), a novel system for the rendering and control of spatial audio. SES provides multiple 3D sound rendering techniques and allows for an arbitrary loudspeaker configuration with an arbitrary number of moving sound sources.

Transaural audio processing is discussed in:

Baskind, Alexis, Thibaut Carpentier, Markus Noisternig, Olivier Warusfel, and Jean-Marc Lyzwa. "Binaural and transaural spatialization techniques in multichannel 5.1 production (Anwendung binauraler and transauraler Wiedergabetechnik in der 5.1 Musikproduktion)." 27th TONMEISTERTAGUNG—VDT INTERNATIONAL CONVENTION, November, 2012

Bosun, Xie, Liu Lulu, and Chengyun Zhang. "Transaural reproduction of spatial surround sound using four actual loudspeakers." In INTER-NOISE and NOISE-CON Congress and Conference Proceedings, vol. 259, no. 9, pp. 61-69. Institute of Noise Control Engineering, 2019.

Casey, Michael A., William G. Gardner, and Sumit Basu. "Vision steered beam-forming and transaural rendering for the artificial life interactive video environment (alive)." In Audio Engineering Society Convention 99. Audio Engineering Society, 1995.

Cooper, Duane H., and Jerald L. Bauck. "Prospects for transaural recording." Journal of the Audio Engineering Society 37, no. ½ (1989): 3-19.

Fazi, Filippo Maria, and Eric Hamdan. "Stage compression in transaural audio." In Audio Engineering Society Convention 144. Audio Engineering Society, 2018.

Gardner, William Grant. Transaural 3-D audio. Perceptual Computing Section, Media Laboratory, Massachusetts Institute of Technology, 1995.

Glasal, Ralph, Ambiophonics, Replacing Stereophonics to Achieve Concert-Hall Realism, 2nd Ed (2015).

Greff, Raphaël. "The use of parametric arrays for transaural applications." In Proceedings of the 20th International Congress on Acoustics, pp. 1-5. 2010.

Guastavino, Catherine, Véronique Larcher, Guillaume Catusseau, and Patrick Boussard. "Spatial audio quality evaluation: comparing transaural, ambisonics and stereo." Georgia Institute of Technology, 2007.

Guldenschuh, Markus, and Alois Sontacchi. "Application of transaural focused sound reproduction." In 6th Eurocontrol INO-Workshop 2009. 2009.

Guldenschuh, Markus, and Alois Sontacchi. "Transaural stereo in a beamforming approach." In Proc. DAFx, vol. 9, pp. 1-6. 2009.

Guldenschuh, Markus, Chris Shaw, and Alois Sontacchi. "Evaluation of a transaural beamformer." In 27th Congress of the International Council of the Aeronautical Sciences (ICAS 2010). Nizza, Frankreich, pp. 2010-10. 2010.

Guldenschuh, Markus. "Transaural beamforming." PhD diss., Master's thesis, Graz University of Technology, Graz, Austria, 2009.

Hartmann, William M., Brad Rakerd, Zane D. Crawford, and Peter Xinya Zhang. "Transaural experiments and a revised duplex theory for the localization of low-frequency tones." The Journal of the Acoustical Society of America 139, no. 2 (2016): 968-985.

Ito, Yu, and Yoichi Haneda. "Investigation into Transaural System with Beamforming Using a Circular Loudspeaker Array Set at Off-center Position from the Listener." Proc. 23rd Int. Cong. Acoustics (2019).

Johannes, Reuben, and Woon-Seng Gan. "3D sound effects with transaural audio beam projection." In 10th Western Pacific Acoustic Conference, Beijing, China, paper, vol. 244, no. 8, pp. 21-23. 2009.

Jost, Adrian, and Jean-Marc Jot. "Transaural 3-d audio with user-controlled calibration." In Proceedings of COST-G6 Conference on Digital Audio Effects, DAFX2000, Verona, Italy. 2000.

Kaiser, Fabio. "Transaural Audio—The reproduction of binaural signals over loudspeakers." PhD diss., Diploma Thesis, Universität für Musik und darstellende Kunst Graz/ Institut für Elekronische Musik und Akustik/IRCAM, March 2011, 2011.

LIU, Lulu, and Bosun XIE. "The limitation of static transaural reproduction with two frontal loudspeakers." (2019)

Méaux, Eric, and Sylvain Marchand. "Synthetic Transaural Audio Rendering (STAR): a Perceptive Approach for Sound Spatialization." 2019.

Samejima, Toshiya, Yo Sasaki, Izumi Taniguchi, and Hiroyuki Kitajima. "Robust transaural sound reproduction system based on feedback control." Acoustical Science and Technology 31, no. 4 (2010): 251-259.

Simon Galvez, Marcos F., and Filippo Maria Fazi. "Loudspeaker arrays for transaural reproduction." (2015).

Simón Gálvez, Marcos Felipe, Miguel Blanco Galindo, and Filippo Maria Fazi. "A study on the effect of reflections and reverberation for low-channel-count Transaural systems." In INTER-NOISE and NOISE-CON Congress and Conference Proceedings, vol. 259, no. 3, pp. 6111-6122. Institute of Noise Control Engineering, 2019.

Villegas, Julián, and Takaya Ninagawa. "Pure-data-based transaural filter with range control." (2016)

en.wikipedia.org/wiki/Perceptual-based_3D_sound_localization

Duraiswami, Grant, Mesgarani, Shamma, Augmented Intelligibility in Simultaneous Multi-talker Environments. 2003, Proceedings of the International Conference on Auditory Display (ICAD'03).

Shohei Nagai, Shunichi Kasahara, Jun Rekimot, "Directional communication using spatial sound in human-telepresence." Proceedings of the 6th Augmented Human International Conference, Singapore 2015, ACM New York, NY, USA, ISBN: 978-1-4503-3349-8

Siu-Lan Tan, Annabel J. Cohen, Scott D. Lipscomb, Roger A. Kendall, "The Psychology of Music in Multimedia", Oxford University Press, 2013.

SUMMARY OF THE INVENTION

In one aspect of the present invention, a system and method are provided for three-dimensional (3-D) audio technologies to create a complex immersive auditory scene that immerses the listener, using a sparse linear (or curvilinear) array of acoustic transducers. A sparse array is an array that has discontinuous spacing with respect to an idealized channel model, e.g., four or fewer sonic emitters, where the sound emitted from the transducers is internally modelled at higher dimensionality, and then reduced or superposed. In some cases, the number of sonic emitters is four or more, derived from a larger number of channels of a channel model, e.g., greater than eight.

Three dimensional acoustic fields are modelled from mathematical and physical constraints. The systems and methods provide a number of loudspeakers, i.e., free-field acoustic transmission transducers that emit into a space including both ears of the targeted listener. These systems are controlled by complex multichannel algorithms in real time.

The system may presume a fixed relationship between the sparse speaker array and the listener's ears, or a feedback system may be employed to track the listener's ears or head movements and position.

The algorithm employed provides surround-sound imaging and sound field control by delivering highly localized audio through an array of speakers. Typically, the speakers in a sparse array seek to operate in a wide-angle dispersion mode of emission, rather than a more traditional "beam mode," in which each transducer emits a narrow angle sound field toward the listener. That is the transducer emission pattern is sufficiently wide to avoid sonic spatial lulls.

In some cases, the system supports multiple listeners within an environment, though in that case, either an enhanced stereo mode of operation, or head tracking is employed. For example, when two listeners are within the environment, nominally the same signal is sought to be presented to the left and right ears of each listener, regardless of their orientation in the room. In a non-trivial implementation, this requires that the multiple transducers cooperate to cancel left-ear emissions at each listener's right ear, and cancel right-ear emissions at each listener's left ear. However, heuristics may be employed to reduce the need for a minimum of a pair of transducers for each listener.

Typically, the spatial audio is not only normalized for binaural audio amplitude control, but also group delay, so that the correct sounds are perceived to be present at each ear at the right time. Therefore, in some cases, the signals may represent a compromise of fine amplitude and delay control.

The source content can thus be virtually steered to various angles so that different dynamically-varying sound fields can be generated for different listeners according to their location.

A signal processing method is provided for delivering spatialized sound in various ways using deconvolution filters to deliver discrete Left/Right ear audio signals from the speaker array. The method can be used to provide private listening areas in a public space, address multiple listeners with discrete sound sources, provide spatialization of source material for a single listener (virtual surround sound), and enhance intelligibility of conversations in noisy environments using spatial cues, to name a few applications.

In some cases, a microphone or an array of microphones may be used to provide feedback of the sound conditions at a voxel in space, such as at or near the listener's ears. While it might initially seem that, with what amounts to a headset, one could simply use single transducers for each ear, the present technology does not constrain the listener to wear headphones, and the result is more natural. Further, the microphone(s) may be used to initially learn the room conditions, and then not be further required, or may be selectively deployed for only a portion of the environment. Finally, microphones may be used to provide interactive voice communications.

In a binaural mode, the speaker array produces two emitted signals, aimed generally towards the primary listener's ears—one discrete beam for each ear. The shapes of these beams are designed using a convolutional or inverse filtering approach such that the beam for one ear contributes almost no energy at the listener's other ear. This provides convincing virtual surround sound via binaural source signals. In this mode, binaural sources can be rendered accurately without headphones. A virtual surround sound experience is delivered without physical discrete surround speakers as well. Note that in a real environment, echoes of walls and surfaces color the sound and produce delays, and a natural sound emission will provide these cues related to the environment. The human ear has some ability to distinguish between sounds from front or rear, due to the shape of the ear and head, but the key feature for most source materials is timing and acoustic coloration. Thus, the liveness of an environment may be emulated by delay filters in the processing, with emission of the delayed sounds from the same array with generally the same beaming pattern as the main acoustic signal.

In one aspect, a method is provided for producing binaural sound from a speaker array in which a plurality of audio signals is received from a plurality of sources and each audio signal is filtered, through a Head-Related Transfer Function (HRTF) based on the position and orientation of the listener to the emitter array. The filtered audio signals are merged to form binaural signals. In a sparse transducer array, it may be desired to provide cross-over signals between the respective binaural channels, though in cases where the array is sufficiently directional to provide physical isolation of the listener's ears, and the position of the listener is well defined and constrained with respect to the array, cross-over may not be required. Typically, the audio signals are processed to provide cross talk cancellation.

When the source signal is prerecorded music or other processed audio, the initial processing may optionally remove the processing effects seeking to isolate original objects and their respective sound emissions, so that the spatialization is accurate for the soundstage. In some cases, the spatial locations inferred in the source are artificial, i.e., object locations are defined as part of a production process, and do not represent an actual position. In such cases, the spatialization may extend back to original sources, and seek to (re)optimize the process, since the original production was likely not optimized for reproduction through a spatialization system.

In a sparse linear speaker array, filtered/processed signals for a plurality of virtual channels are processed separately, and then combined, e.g., summed, for each respective virtual speaker into a single speaker signal, then the speaker signal is fed to the respective speaker in the speaker array and transmitted through the respective speaker to the listener.

The summing process may correct the time alignment of the respective signals. That is, the original complete array signals have time delays for the respective signals with respect to each ear. When summed without compensation, to produce a composite signal that signal would include multiple incrementally time-delayed representations, which arrive at the ears at different times, representing the same timepoint. Thus, the compression in space leads to an expansion in time. However, since the time delays are programmed per the algorithm, these may be algorithmically compressed to restore the time alignment.

The result is that the spatialized sound has an accurate time of arrival at each ear, phase alignment, and a spatialized sound complexity.

In another aspect, a method is provided for producing a localized sound from a speaker array by receiving at least one audio signal, filtering each audio signal through a set of spatialization filters (each input audio signal is filtered through a different set of spatialization filters, which may be interactive or ultimately combined), wherein a separate spatialization filter path segment is provided for each speaker in the speaker array so that each input audio signal is filtered through a different spatialization filter segment, summing the filtered audio signals for each respective speaker into a speaker signal, transmitting each speaker signal to the respective speaker in the speaker array, and delivering the signals to one or more regions of the space (typically occupied by one or multiple listeners, respectively).

In this way, the complexity of the acoustic signal processing path is simplified as a set of parallel stages representing array locations, with a combiner. An alternate method for providing two-speaker spatialized audio provides an object-based processing algorithm, which beam traces audio paths between respective sources, off scattering objects, to the listener's ears. This later method provides more arbitrary algorithmic complexity, and lower uniformity of each processing path.

In some cases, the filters may be implemented as recurrent neural networks or deep neural networks, which typically emulate the same process of spatialization, but without explicit discrete mathematical functions, and seeking an optimum overall effect rather than optimization of each effect in series or parallel. The network may be an overall network that receives the sound input and produces the sound output, or a channelized system in which each channel, which can represent space, frequency band, delay, source object, etc., is processed using a distinct network, and the network outputs combined. Further, the neural networks or other statistical optimization networks may provide coefficients for a generic signal processing chain, such as a digital filter, which may be finite impulse response (FIR) characteristics and/or infinite impulse response (IIR) characteristics, bleed paths to other channels, specialized time and delay equalizers (where direct implementation through FIR or IIR filters is undesired or inconvenient).

More typically, a discrete digital signal processing algorithm is employed to process the audio data, based on physical (or virtual) parameters. In some cases, the algorithm may be adaptive, based on automated or manual feedback. For example, a microphone may detect distortion due to resonances or other effects, which are not intrinsically compensated in the basic algorithm. Similarly, a generic HRTF may be employed, which is adapted based on actual parameters of the listener's head.

In a further aspect, a speaker array system for producing localized sound comprises an input which receives a plurality of audio signals from at least one source; a computer with a processor and a memory which determines whether the plurality of audio signals should be processed by an audio signal processing system; a speaker array comprising a plurality of loudspeakers; wherein the audio signal processing system comprises: at least one Head-Related Transfer Function (HRTF), which either senses or estimates a spatial relationship of the listener to the speaker array; and combiners configured to combine a plurality of processing channels to form a speaker drive signal. The audio signal processing system implements spatialization filters; wherein the speaker array delivers the respective speaker signals (or the beamforming speaker signals) through the plurality of loudspeakers to one or more listeners.

By beamforming, it is intended that the emission of the transducer is not omnidirectional or cardioid, and rather has an axis of emission, with separation between left and right ears greater than 3 dB, preferably greater than 6 dB, more preferably more than 10 dB, and with active cancellation between transducers, higher separations may be achieved.

The plurality of audio signals can be processed by the digital signal processing system including binauralization before being delivered to the one or more listeners through the plurality of loudspeakers.

A listener head-tracking unit may be provided which adjusts the binaural processing system and acoustic processing system based on a change in a location of the one or more listeners.

The binaural processing system may further comprise a binaural processor which computes the left HRTF and right HRTF, or a composite HRTF in real-time.

The inventive method employs algorithms that allow it to deliver beams configured to produce binaural sound—targeted sound to each ear—without the use of headphones, by using deconvolution or inverse filters and physical or virtual beamforming. In this way, a virtual surround sound experience can be delivered to the listener of the system. The system avoids the use of classical two-channel "cross-talk cancellation" to provide superior speaker-based binaural sound imaging.

Binaural 3D sound reproduction is a type of sound preproduction achieved by headphones. On the other hand, transaural 3D sound reproduction is a type of sound preproduction achieved by loudspeakers. See, Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, March 2011, 2011. Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, March 2011, 2011. Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, March 2011, 2011. Transaural audio is a three-dimensional sound spatialization technique which is capable of reproducing binaural signals over loudspeakers. It is based on the cancellation of the acoustic paths occurring between loudspeakers and the listeners ears.

Studies in psychoacoustics reveal that well recorded stereo signals and binaural recordings contain cues that help create robust, detailed 3D auditory images. By focusing left and right channel signals at the appropriate ear, one implementation of 3D spatialized audio, called "MyBeam" (Comhear Inc., San Diego CA) maintains key psychoacoustic cues while avoiding crosstalk via precise beamformed directivity.

Together, these cues are known as Head Related Transfer Functions (HRTF). Briefly stated, HRTF component cues are interaural time difference (ITD, the difference in arrival time of a sound between two locations), the interaural intensity difference (IID, the difference in intensity of a sound between two locations, sometimes called ILD), and interaural phase difference (IPD, the phase difference of a wave that reaches each ear, dependent on the frequency of the sound wave and the ITD). Once the listener's brain has analyzed IPD, ITD, and ILD, the location of the sound source can be determined with relative accuracy.

The present invention provides a method for the optimization of beamforming and controlling a small linear speaker array to produce spatialized, localized, and binaural or trans aural virtual surround or 3D sound. The signal processing method allows a small speaker array to deliver sound in various ways using highly optimized inverse filters, delivering narrow beams of sound to the listener while producing negligible artifacts. Unlike earlier compact beamforming audio technologies, the present method does not rely on ultra-sonic or high-power amplification. The technology may be implemented using low power technologies, producing 98 dB SPL at one meter, while utilizing around 20 watts of peak power. In the case of speaker applications, the primary use-case allows sound from a small (10"-20") linear array of speakers to focus sound in narrow beams to:

- Direct sound in a highly intelligible manner where it is desired and effective;
- Limit sound where it is not wanted or where it may be disruptive
- Provide non-headphone based, high definition, steerable audio imaging in which a stereo or binaural signal is directed to the ears of the listener to produce vivid 3D audible perception.

In the case of microphone applications, the basic use-case allows sound from an array of microphones (ranging from a few small capsules to dozens in 1-, 2- or 3-dimensional arrangements) to capture sound in narrow beams. These beams may be dynamically steered and may cover many talkers and sound sources within its coverage pattern, amplifying desirable sources and providing for cancellation or suppression of unwanted sources.

In a multipoint teleconferencing or videoconferencing application, the technology allows distinct spatialization and localization of each participant in the conference, providing a significant improvement over existing technologies in which the sound of each talker is spatially overlapped. Such overlap can make it difficult to distinguish among the different participants without having each participant identify themselves each time he or she speaks, which can detract from the feel of a natural, in-person conversation. Additionally, the invention can be extended to provide real-time beam steering and tracking of the listener's location using video analysis or motion sensors, therefore continuously optimizing the delivery of binaural or spatialized audio as the listener moves around the room or in front of the speaker array.

The system may be smaller and more portable than most, if not all, comparable speaker systems. Thus, the system is useful for not only fixed, structural installations such as in rooms or virtual reality caves, but also for use in private vehicles, e.g., cars, mass transit, such buses, trains and airplanes, and for open areas such as office cubicles and wall-less classrooms.

The technology is improved over the MyBeam™, in that it provides similar applications and advantages, while requiring fewer speakers and amplifiers. For example, the method virtualizes a 12-channel beamforming array to two channels. In general, the algorithm downmixes each pair of 6 channels (designed to drive a set of 6 equally spaced-speakers in a line array) into a single speaker signal for a speaker that is mounted in the middle of where those 6 speakers would be. Typically, the virtual line array is 12 speakers, with 2 real speakers located between elements 3-4 and 9-10.

The real speakers are mounted directly in the center of each set of 6 virtual speakers. If (s) is the center-to-center distance between speakers, then the distance from the center of the array to the center of each real speaker is:

$$A=3*s$$

The left speaker is offset −A from the center, and the right speaker is offset A.

The primary algorithm is simply a downmix of the 6 virtual channels, with a limiter and/or compressor applied to prevent saturation or clipping. For example, the left channel is:

$$L_{out}=\text{Limit}(L_1+L_2+L_3+L_4+L_5+L_6)$$

However, because of the change in positions of the source of the audio, the delays between the speakers need to be taken into account as described below. In some cases, the phase of some drivers may be altered to limit peaking, while avoiding clipping or limiting distortion.

Since six speakers are being combined into one at a different location, the change in distance travelled, i.e., delay, to the listener can be significant particularly at higher frequencies. The delay can be calculated based on the change in travelling distance between the virtual speaker and the real speaker.

For this discussion, we will only concern ourselves with the left side of the array. The right side is similar but inverted.

To calculate the distance from the listener to each virtual speaker, assume that the speaker, n, is numbered 1 to 6, where 1 is the speaker closest to the center, and 6 is the farthest left. The distance from the center of the array to the speaker is:

$$d=((n-1)+0.5)*s$$

Using the Pythagorean theorem, the distance from the speaker to the listener can be calculated as follows:

$$d_n=\sqrt{l^2+(((n-1)+0.5)*s)^2}$$

The distance from the real speaker to the listener is $$d_r=\sqrt{l^2+(3*s)^2}$$

The sample delay for each speaker can be calculated by the different between the two listener distances. This can them be converted to samples (assuming the speed of sound is 343 m/s and the sample rate is 48 kHz.

$$\text{delay}=\frac{(d_n-d_r)}{343\frac{m}{s}}*48000\text{ Hz}$$

This can lead to a significant delay between listener distances. For example, if the speaker-to-speaker distance is 38 mm, and the listener is 500 mm from the array, the delay from the virtual far-left speaker (n=6) to the real speaker is:

$$d_n=\sqrt{.5^2+(5.5*.038)^2}=.541\text{ m}$$

$$d_r=\sqrt{.5^2+(3*.038)^2}=.513\text{ m}$$

$$\text{delay}=\frac{.541-.512}{343}*48000=4\text{ samples}$$

Though the delay seems small, the amount of delay is significant, particularly at higher frequencies, where an entire cycle may be as little as 3 or 4 samples.

TABLE 1

| Speaker | Delay relative to real speaker |
|---|---|
| 1 | −2 |
| 2 | −1 |
| 3 | −1 |
| 4 | 1 |
| 5 | 2 |
| 6 | 4 |

Thus, when combining the signals for the virtual speakers into the physical speaker signal, the time offset is preferably compensated based on the displacement of the virtual speaker from the physical one. This can be accomplished at various places in the signal processing chain.

The present technology therefore provides downmixing of spatialized audio virtual channels to maintain delay encoding of virtual channels while minimizing the number of physical drivers and amplifiers required.

At similar acoustic output, the power per speaker will, of course, be higher with the downmixing, and this leads to peak power handling limits. Given that the amplitude, phase and delay of each virtual channel is important information, the ability to control peaking is limited. However, given that clipping or limiting is particularly dissonant, control over the other variables is useful in achieving a high power rating. Control may be facilitated by operating on a delay, for example in a speaker system with a 30 Hz lower range, a 125 mS delay may be imposed, to permit calculation of all significant echoes and peak clipping mitigation strategies. Where video content is also presented, such a delay may be reduced. However, delay is not required.

In some cases, the listener is not centered with respect to the physical speaker transducers, or multiple listeners are dispersed within an environment. Further, the peak power to a physical transducer resulting from a proposed downmix may exceed a limit. The downmix algorithm in such cases, and others, may be adaptive or flexible, and provide different mappings of virtual transducers to physical speaker transducers.

For example, due to listener location or peak level, the allocation of virtual transducers in the virtual array to the physical speaker transducer downmix may be unbalanced, such as, in an array of 12 virtual transducers, 7 virtual transducers downmixed for the left physical transducer, and 5 virtual transducers for the right physical transducer. This has the effect of shifting the axis of sound, and also shifting the additive effect of the adaptively assigned transducer to the other channel. If the transducer is out of phase with respect to the other transducers, the peak will be abated, while if it is in phase, constructive interference will result.

The reallocation may be of the virtual transducer at a boundary between groups, or may be a discontinuous virtual transducer. Similarly, the adaptive assignment may be of more than one virtual transducer.

In addition, the number of physical transducers may be an even or odd number greater than 2, and generally less than the number of virtual transducers. In the case of three physical transducers, generally located at nominal left, center and right, the allocation between virtual transducers and physical transducers may be adaptive with respect to group size, group transition, continuity of groups, and possible overlap of groups (i.e., portions of the same virtual transducer signal being represented in multiple physical channels) based on location of listener (or multiple listeners), spatialization effects, peak amplitude abatement issues, and listener preferences.

The system may employ various technologies to implement an optimal HRTF. In the simplest case, an optimal prototype HRTF is used regardless of listener and environment. In other cases, the characteristics of the listener(s) are determined by logon, direct input, camera, biometric measurement, or other means, and a customized or selected HRTF selected or calculated for the particular listener(s). This is typically implemented within the filtering process, independent of the downmixing process, but in some cases, the customization may be implemented as a post-process or partial post-process to the spatialization filtering. That is, in addition to downmixing, a process after the main spatialization filtering and virtual transducer signal creation may be implemented to adapt or modify the signals dependent on the listener(s), the environment, or other factors, separate from downmixing and timing adjustment.

As discussed above, limiting the peak amplitude is potentially important, as a set of virtual transducer signals, e.g., 6, are time aligned and summed, resulting in a peak amplitude potentially six times higher than the peak of any one virtual transducer signal. One way to address this problem is to simply limit the combined signal or use a compander (non-linear amplitude filter). However, these produce distortion, and will interfere with spatialization effects. Other options include phase shifting of some virtual transducer signals, but this may also result in audible artifacts, and requires imposition of a delay. Another option provided is to allocate virtual transducers to downmix groups based on phase and amplitude, especially those transducers near the transition between groups. While this may also be implemented with a delay, it is also possible to near instantaneously shift the group allocation, which may result in a positional artifact, but not a harmonic distortion artifact. Such techniques may also be combined, to minimize perceptual distortion by spreading the effect between the various peak abatement options.

It is therefore an object to provide a method for producing transaural spatialized sound, comprising: receiving audio signals representing spatial audio objects; filtering each audio signal through a spatialization filter to generate an array of virtual audio transducer signals for a virtual audio transducer array representing spatialized audio; segregating the array of virtual audio transducer signals into subsets each comprising a plurality of virtual audio transducer signals, each subset being for driving a physical audio transducer situated within a physical location range of the respective subset; time-offsetting respective virtual audio transducer signals of a respective subset based on a time difference of arrival of a sound from a nominal location of respective virtual audio transducer and the physical location of the corresponding physical audio transducer with respect to a targeted ear of a listener; and combining the time-offsetted respective virtual speaker signals of the respective subset as a physical audio transducer drive signal.

It is another object to provide a system for producing transaural spatialized sound, comprising: an input configured to receive audio signals representing spatial audio objects; a spatialization audio data filter, configured to process each audio signal to generate an array of virtual audio transducer signals for a virtual audio transducer array representing spatialized audio, the array of virtual audio transducer signals being segregated into subsets each comprising a plurality of virtual audio transducer signals, each subset being for driving a physical audio transducer situated within a physical location range of the respective subset; a time-delay processor, configured to time-offset respective virtual audio transducer signals of a respective subset based on a time difference of arrival of a sound from a nominal location of respective virtual audio transducer and the physical location of the corresponding physical audio transducer with respect to a targeted ear of a listener; and a combiner, configured to combine the time-offset respective virtual speaker signals of the respective subset as a physical audio transducer drive signal.

It is a further object to provide a system for producing spatialized sound, comprising: an input configured to receive audio signals representing spatial audio objects; at least one automated processor, configured to: process each audio signal through a spatialization filter to generate an array of virtual audio transducer signals for a virtual audio transducer array representing spatialized audio, the array of virtual audio transducer signals being segregated into subsets each comprising a plurality of virtual audio transducer signals, each subset being for driving a physical audio transducer situated within a physical location range of the respective subset; time-offset respective virtual audio transducer signals of a respective subset based on a time difference of arrival of a sound from a nominal location of respective virtual audio transducer and the physical location of the corresponding physical audio transducer with respect to a targeted ear of a listener; and combine the time-offset respective virtual speaker signals of the respective subset as a physical audio transducer drive signal; and at least one output port configured to present the physical audio transducer drive signals for respective subsets.

The method may further comprise abating a peak amplitude of the combined time-offsetted respective virtual audio transducer signals to reduce saturation distortion of the physical audio transducer.

The filtering may comprise processing at least two audio channels with a digital signal processor. The filtering may comprise processing at least two audio channels with a graphic processing unit configured to act as an audio signal processor.

The array of virtual audio transducer signals may be a linear array of 12 virtual audio transducers. The virtual audio transducer array may be a linear array having at least 3 times a number of virtual audio transducer signals as physical audio transducer drive signals. The virtual audio transducer array may be a linear array having at least 6 times a number of virtual audio transducer signals as physical audio transducer drive signals.

Each subset may be a non-overlapping adjacent group of virtual audio transducer signals. Each subset may be a non-overlapping adjacent group of at least 6 virtual audio transducer signals. Each subset may have a virtual audio transducer with a location which overlaps a represented location range of another subset of virtual audio transducer signals. The overlap may be one virtual audio transducer signal.

The array of virtual audio transducer signals may be a linear array having 12 virtual audio transducer signals, divided into two non-overlapping groups of 6 adjacent virtual audio transducer signals each, which are respectively combined to form 2 physical audio transducer drive signals. The corresponding physical audio transducer for each group may be located between the 3rd and 4th virtual audio transducer of the adjacent group of 6 virtual audio transducer signals.

The physical audio transducer may have a non-directional emission pattern. The virtual audio transducer array may be modelled for directionality. The virtual audio transducer array may be a phased array of audio transducers.

The filtering may comprise cross-talk cancellation. The filtering may be performed using reentrant data filters.

The method may further comprise receiving a signal representing an ear location of the listener. The method may further comprise tracking a movement of the listener, and adapting the filtering dependent on the tracked movement.

The method may further comprise adaptively assigning virtual audio transducer signals to respective subsets.

The method may further comprise adaptively determining a head related transfer function of a listener, and filtering according to the adaptively determined a head related transfer function.

The method may further comprise sensing a characteristic of a head of the listener, and adapting the head related transfer function in dependence on the characteristic.

The filtering may comprise a time-domain filtering, or a frequency-domain filtering.

The physical audio transducer drive signal may be delayed by at least 25 mS with respect to the received audio signals representing spatial audio objects.

The system may further comprise a peak amplitude abatement filter, limiter or compander, configured to reduce saturation distortion of the physical audio transducer of the combined time-offsetted respective virtual audio transducer signals.

The system may further comprise a phase rotator configured to rotate a relative phase of at least one virtual audio transducer signal.

The spatialization audio data filter may comprise a digital signal processor configured to process at least two audio channels. The spatialization audio data filter may comprise a graphic processing unit, configured to process at least two audio channels.

The spatialization audio data filter may be configured to perform cross-talk cancellation. The spatialization audio data filter may comprise a reentrant data filter.

The system may further comprise an input port configured to receive a signal representing an ear location of the listener.

The system may further comprise an input configured to receive a signal tracking a movement of the listener, wherein the spatialization audio data filter is adaptive dependent on the tracked movement.

Virtual audio transducer signals may be adaptively assigned to respective subsets.

The spatialization audio data filter may be dependent on an adaptively determined a head related transfer function of a listener.

The system may further comprise an input port configured to receive a signal comprising a sensed characteristic of a head of the listener, wherein the head related transfer function is adapted in dependence on the characteristic.

The spatialization audio data filter may comprise a time-domain filter and/or a frequency-domain filter.

DETAILED DESCRIPTION

Figure 1A:
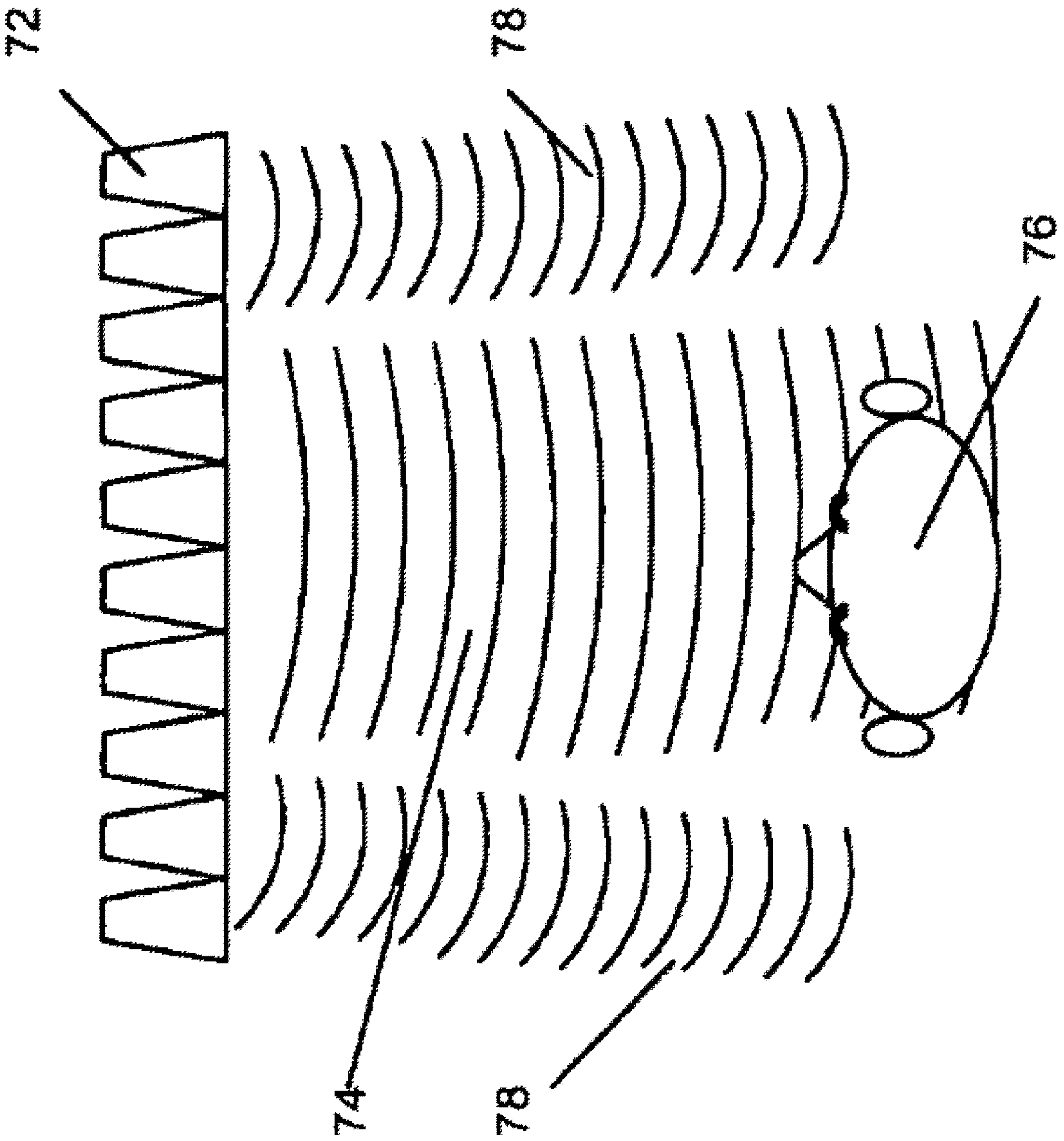
Fig. 1A Prior Art
FIG. 1A is a diagram illustrating the wave field synthesis (WFS) mode operation used for private listening.

In binaural mode, the speaker array provides two sound outputs aimed towards the primary listener's ears. The inverse filter design method comes from a mathematical simulation in which a speaker array model approximating the real-world is created and virtual microphones are placed throughout the target sound field. A target function across these virtual microphones is created or requested. Solving the inverse problem using regularization, stable and realizable inverse filters are created for each speaker element in the array. The source signals are convolved with these inverse filters for each array element.

In a second beamforming, or wave field synthesis (WFS), mode, the transform processor array provides sound signals representing multiple discrete sources to separate physical locations in the same general area. Masking signals may also be dynamically adjusted in amplitude and time to provide optimized masking and lack of intelligibility of listener's signal of interest.

The WFS mode also uses inverse filters. Instead of aiming just two beams at the listener's ears, this mode uses multiple beams aimed or steered to different locations around the array.

The technology involves a digital signal processing (DSP) strategy that allows for the both binaural rendering and WFS/sound beamforming, either separately or simultaneously in combination. As noted above, the virtual spatialization is then combined for a small number of physical transducers, e.g., 2 or 4.

For both binaural and WFS mode, the signal to be reproduced is processed by filtering it through a set of digital filters. These filters may be generated by numerically solving an electro-acoustical inverse problem. The specific parameters of the specific inverse problem to be solved are described below. In general, however, the digital filter design is based on the principle of minimizing, in the least squares sense, a cost function of the type $J=E+\beta V$ The cost function is a sum of two terms: a performance error E, which measures how well the desired signals are reproduced at the target points, and an effort penalty $\beta V$, which is a quantity proportional to the total power that is input to all the loudspeakers. The positive real number $\beta$ is a regularization parameter that determines how much weight to assign to the effort term. Note that, according to the present implementation, the cost function may be applied after the summing, and optionally after the limiter/peak abatement function is performed.

By varying $\beta$ from zero to infinity, the solution changes gradually from minimizing the performance error only to minimizing the effort cost only. In practice, this regularization works by limiting the power output from the loudspeakers at frequencies at which the inversion problem is ill-conditioned. This is achieved without affecting the performance of the system at frequencies at which the inversion problem is well-conditioned. In this way, it is possible to prevent sharp peaks in the spectrum of the reproduced sound. If necessary, a frequency dependent regularization parameter can be used to attenuate peaks selectively.

Wave Field Synthesis/Beamforming Mode

WFS sound signals are generated for a linear array of virtual speakers, which define several separated sound beams. In WFS mode operation, different source content from the loudspeaker array can be steered to different angles by using narrow beams to minimize leakage to adjacent areas during listening. As shown in FIG. 1A, private listening is made possible using adjacent beams of music and/or noise delivered by loudspeaker array 72. The direct sound beam 74 is heard by the target listener 76, while beams of masking noise 78, which can be music, white noise or some other signal that is different from the main beam 74, are directed around the target listener to prevent unintended eavesdropping by other persons within the surrounding area. Masking signals may also be dynamically adjusted in amplitude and time to provide optimized masking and lack of intelligibility of listener's signal of interest as shown in later figures which include the DRCE DSP block.

When the virtual speaker signals are combined, a significant portion of the spatial sound cancellation ability is lost; however, it is at least theoretically possible to optimize the sound at each of the listener's ears for the direct (i.e., non-reflected) sound path.

Figure 1B:
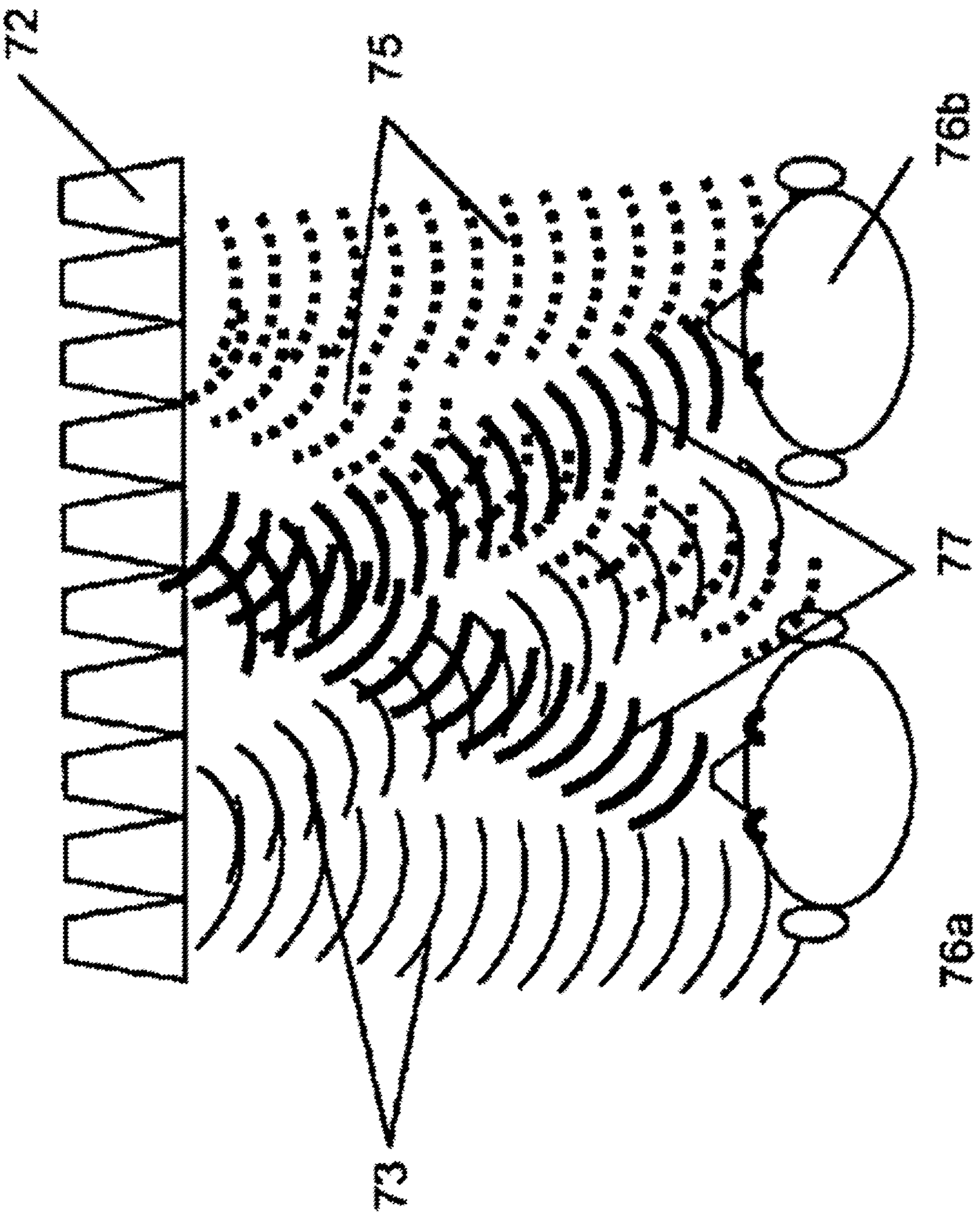
Fig. 1B Prior Art
FIG. 1B is a diagram illustrating use of WFS mode for multi-user, multi-position audio applications.

In the WFS mode, the array provides multiple discrete source signals. For example, three people could be positioned around the array listening to three distinct sources with little interference from each others' signals. FIG. 1B illustrates an exemplary configuration of the WFS mode for multi-user/multi-position application. With only two speaker transducers, full control for each listener is not possible, though through optimization, an acceptable (improved over stereo audio) is available. As shown, array 72 defines discrete sounds beams 73, 75 and 77, each with different sound content, to each of listeners 76*a* and 76*b*. While both listeners are shown receiving the same content (each of the three beams), different content can be delivered to one or the other of the listeners at different times. When the array signals are summed, some of the directionality is lost, and in some cases, inverted. For example, where a set of 12 speaker array signals are summed to 4 speaker signals, directional cancellation signals may fail to cancel at most locations. However, preferably adequate cancellation is preferably available for an optimally located listener.

Figure 2:
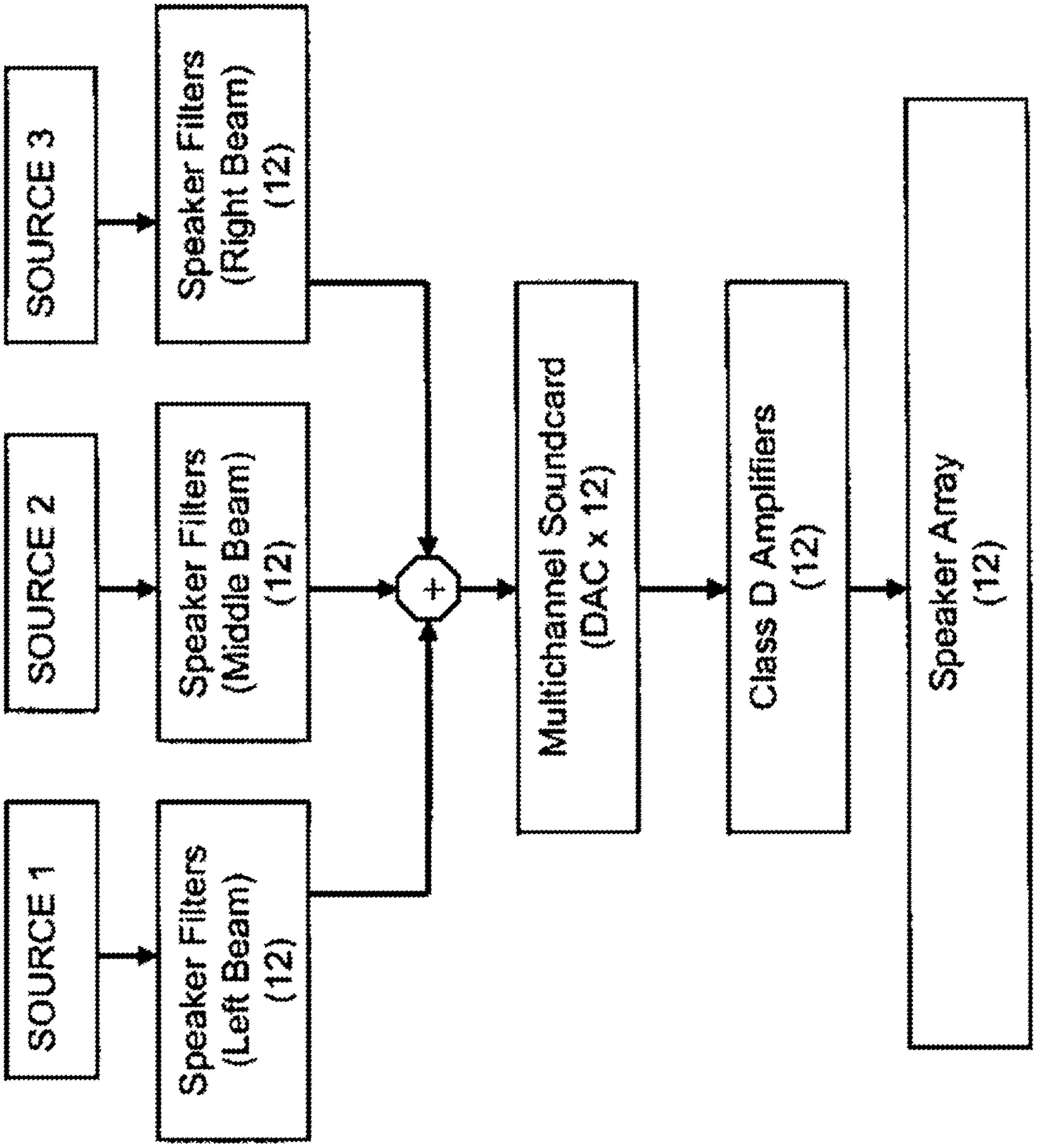
Fig. 2 Prior Art
FIG. 2 is a block diagram showing the WFS signal processing chain.

The WFS mode signals are generated through the DSP chain as shown in FIG. 2. Discrete source signals 801, 802 and 803 are each convolved with inverse filters for each of the loudspeaker array signals. The inverse filters are the mechanism that allows that steering of localized beams of audio, optimized for a particular location according to the specification in the mathematical model used to generate the filters. The calculations may be done real-time to provide on-the-fly optimized beam steering capabilities which would allow the users of the array to be tracked with audio. In the illustrated example, the loudspeaker array 812 has twelve elements, so there are twelve filters 804 for each source. The resulting filtered signals corresponding to the same $n^{th}$ loudspeaker signal are added at combiner 806, whose resulting signal is fed into a multi-channel soundcard 808 with a DAC corresponding to each of the twelve speakers in the array. The twelve signals are then divided into channels, i.e., 2 or 4, and the members of each subset are then time adjusted for the difference in location between the physical location of the corresponding array signal, and the respective physical transducer, and summed, and subject to a limiting algorithm. The limited signal is then amplified using a class D amplifier 810 and delivered to the listener(s) through the two or four speaker array 812.

Figure 3:
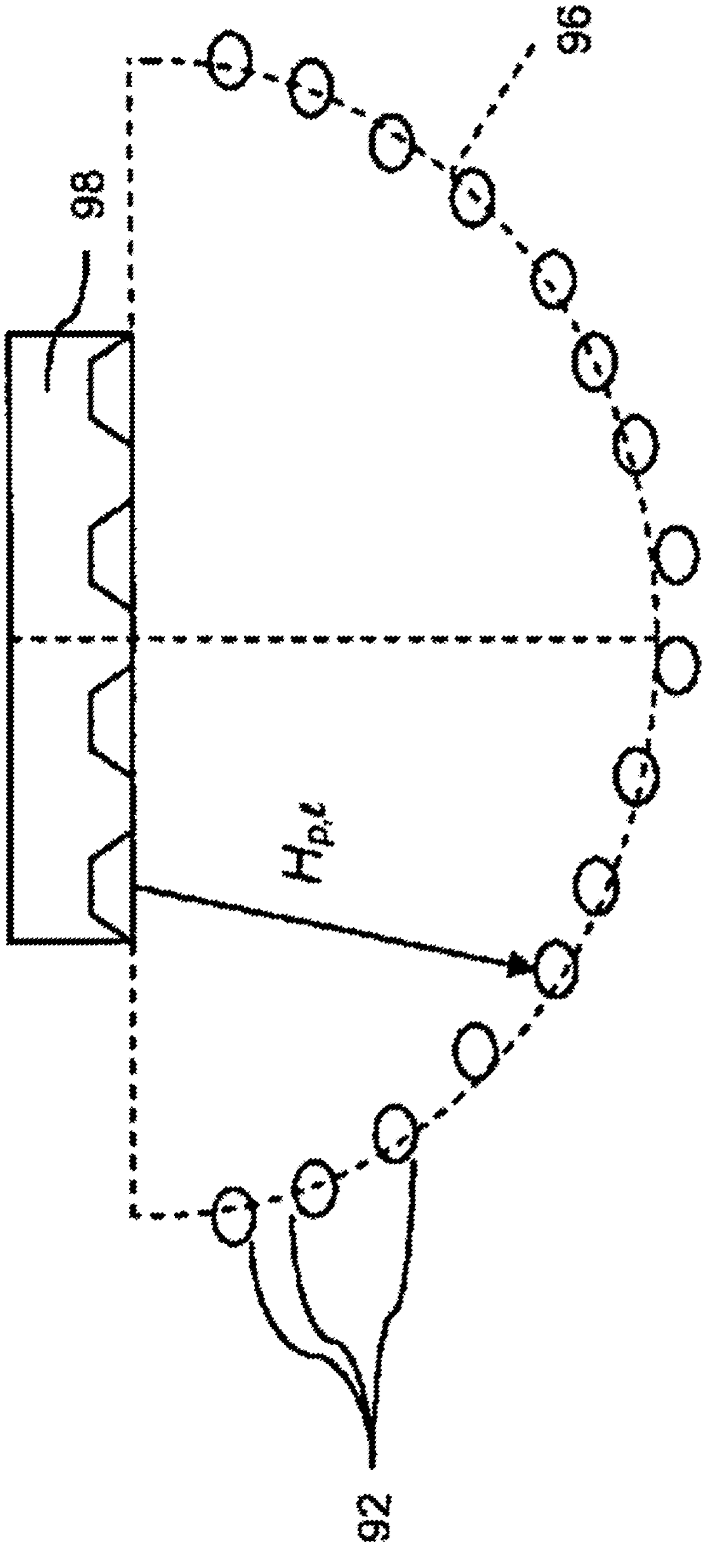
Fig. 3 Prior Art
FIG. 3 is a diagrammatic view of an exemplary arrangement of control points for WFS mode operation.

FIG. 3 illustrates how spatialization filters are generated. Firstly, it is assumed that the relative arrangement of the N array units is given. A set of M virtual control points 92 is defined where each control point corresponds to a virtual microphone. The control points are arranged on a semicircle surrounding the array 98 of N speakers and centered at the center of the loudspeaker array. The radius of the arc 96 may scale with the size of the array. The control points 92 (virtual microphones) are uniformly arranged on the arc with a constant angular distance between neighboring points.

An M×N matrix H(f) is computed, which represents the electro-acoustical transfer function between each loudspeaker of the array and each control point, as a function of the frequency f, where $H_p$,1 corresponds to the transfer function between the $1^{th}$ speaker (of N speakers) and the $p^{th}$ control point 92. These transfer functions can either be measured or defined analytically from an acoustic radiation model of the loudspeaker. One example of a model is given by an acoustical monopole, given by the following equation:

$$H_{p,\ell(f)} = \frac{\exp\left[-j2\pi f r_{p,\ell}/c\right]}{4\pi r_{p,\ell}}$$

where c is the speed of sound propagation, f is the frequency and $r_{p,l}$ is the distance between the $l^{th}$ loudspeaker and the $p^{th}$ control point.

Instead of correcting for time delays after the array signals are fully defined, it is also possible to use the correct speaker location while generating the signal, to avoid reworking the signal definition.

A more advanced analytical radiation model for each loudspeaker may be obtained by a multipole expansion, as is known in the art. (See, e.g., V. Rokhlin, "Diagonal forms of translation operators for the Helmholtz equation in three dimensions", Applied and Computations Harmonic Analysis, 1:82-93, 1993.)

A vector p(f) is defined with M elements representing the target sound field at the locations identified by the control points 92 and as a function of the frequency f. There are several choices of the target field. One possibility is to assign the value of 1 to the control point(s) that identify the direction(s) of the desired sound beam(s) and zero to all other control points.

The digital filter coefficients are defined in the frequency (f) domain or digital-sampled (z)-domain and are the N elements of the vector a(f) or a(z), which is the output of the filter computation algorithm. The filer may have different topologies, such as FIR, IIR, or other types. The vector a is computed by solving, for each frequency f or sample parameter z, a linear optimization problem that minimizes e.g., the following cost function $$J(f)=\|H(f)a(f)-p(f)\|^2+\beta\|a(f)\|^2$$

The symbol $\| \ldots \|$ indicates the $L^2$ norm of a vector, and $\beta$ is a regularization parameter, whose value can be defined by the designer. Standard optimization algorithms can be used to numerically solve the problem above.

Figure 4:
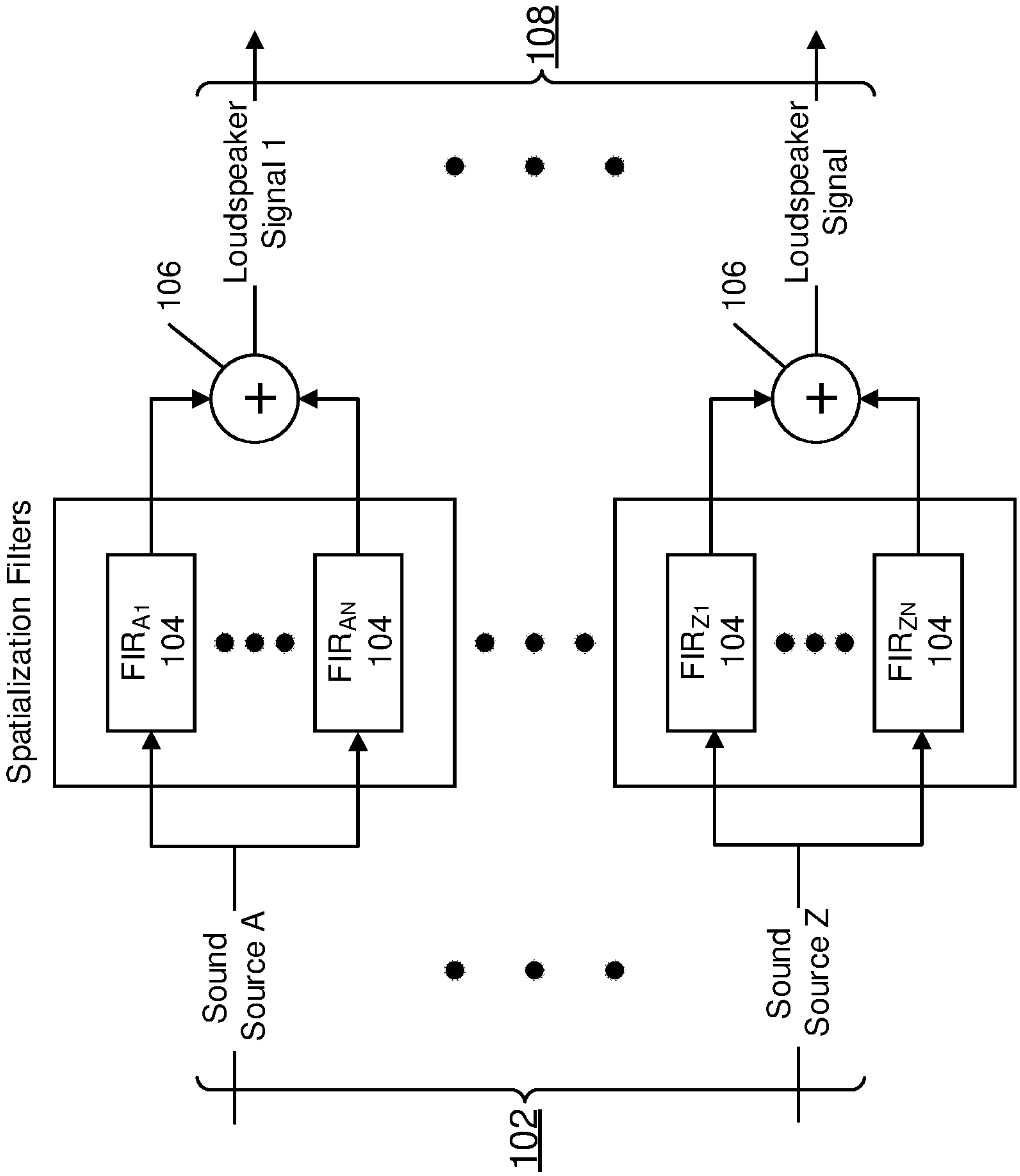
Fig. 4 Prior Art
FIG. 4 is a diagrammatic view of a first embodiment of a signal processing scheme for WFS mode operation.

Referring now to FIG. 4, the input to the system is an arbitrary set of audio signals (from A through Z), referred to as sound sources 102. The system output is a set of audio signals (from 1 through N) driving the N units of the loudspeaker array 108. These N signals are referred to as "loudspeaker signals".

For each sound source 102, the input signal is filtered through a set of N digital filters 104, with one digital filter 104 for each loudspeaker of the array. These digital filters 104 are referred to as "spatialization filters", which are generated by the algorithm disclosed above and vary as a function of the location of the listener(s) and/or of the intended direction of the sound beam to be generated.

The digital filters may be implemented as finite impulse response (FIR) filters; however, greater efficiency and better modelling of response may be achieved using other filter topologies, such as infinite impulse response (IIR) filters, which employ feedback or re-entrancy. The filters may be implemented in a traditional DSP architecture, or within a graphic processing unit (GPU, developer.nvidia.com/vr-works-audio-sdk-depth) or audio processing unit (APU, www.nvidia.com/en-us/drivers/apu/). Advantageously, the acoustic processing algorithm is presented as a ray tracing, transparency, and scattering model.

For each sound source 102, the audio signal filtered through the $n^{th}$ digital filter 104 (i.e., corresponding to the $n^{th}$ oudspeaker) is summed at combiner 106 with the audio signals corresponding to the different audio sources 102 but to the same $n^{th}$ loudspeaker. The summed signals are then output to loudspeaker array 108.

Figure 5:
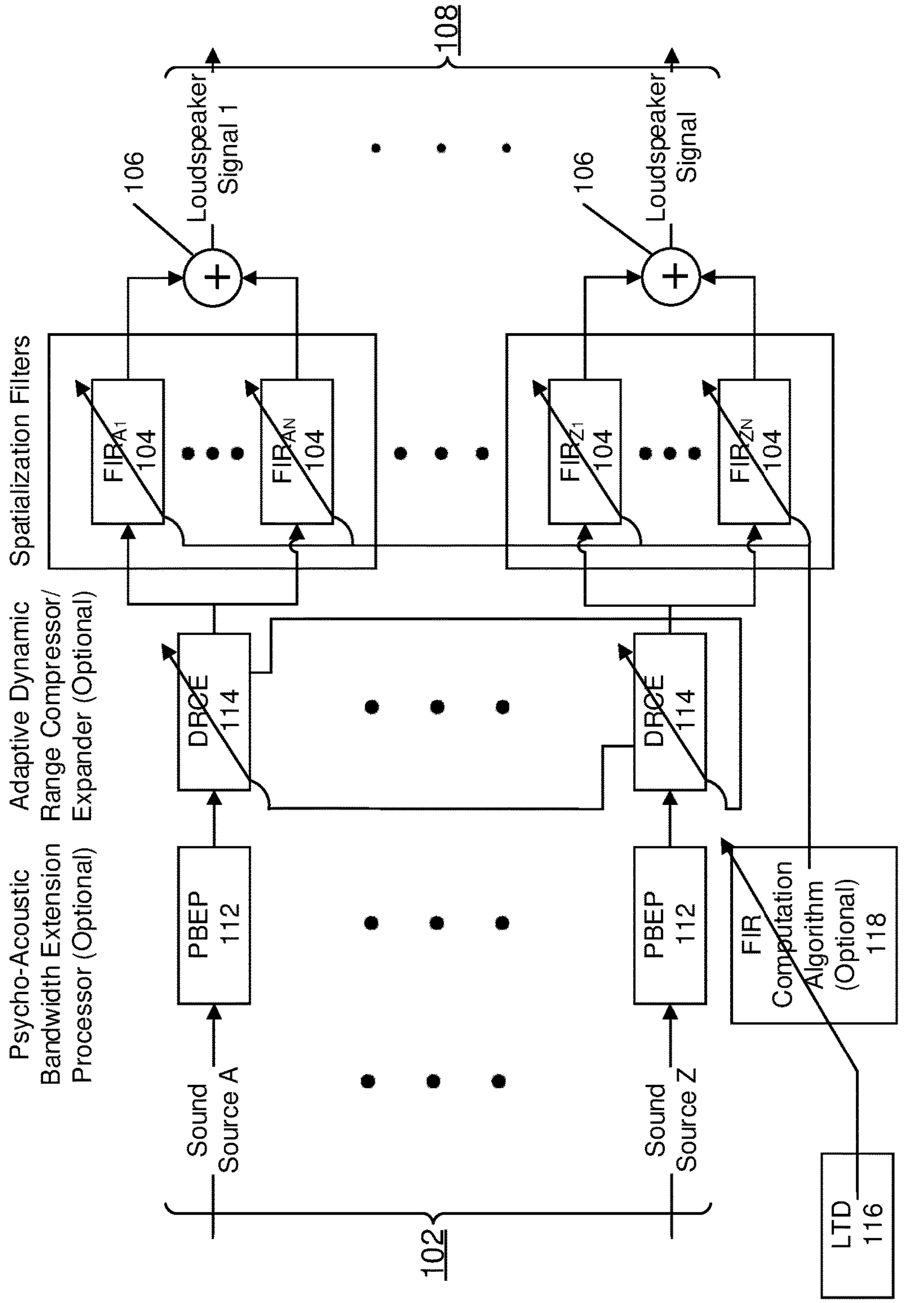
Fig. 5 Prior Art
FIG. 5 is a diagrammatic view of a second embodiment of a signal processing scheme for WFS mode operation.
Figure 6B:
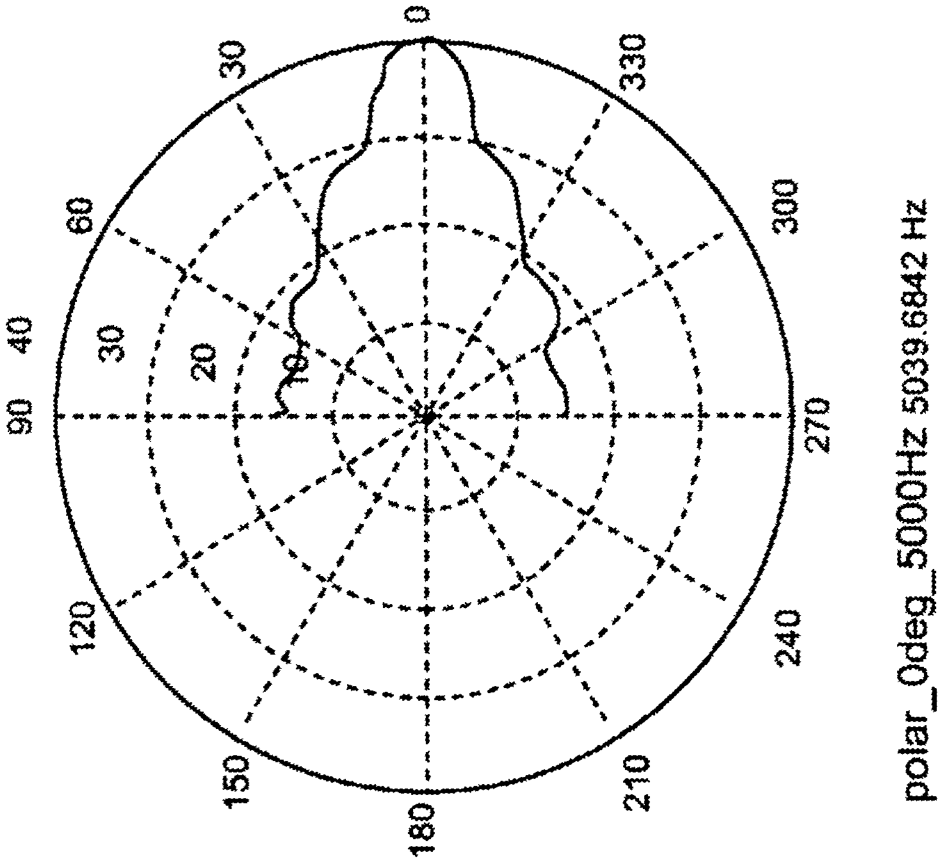
Fig. 6B Prior Art
FIGS. 6A-6E are a set of polar plots showing measured performance of a prototype speaker array with the beam steered to 0 degrees at frequencies of 10000, 5000, 2500, 1000 and 600 Hz, respectively.
Figure 6A:
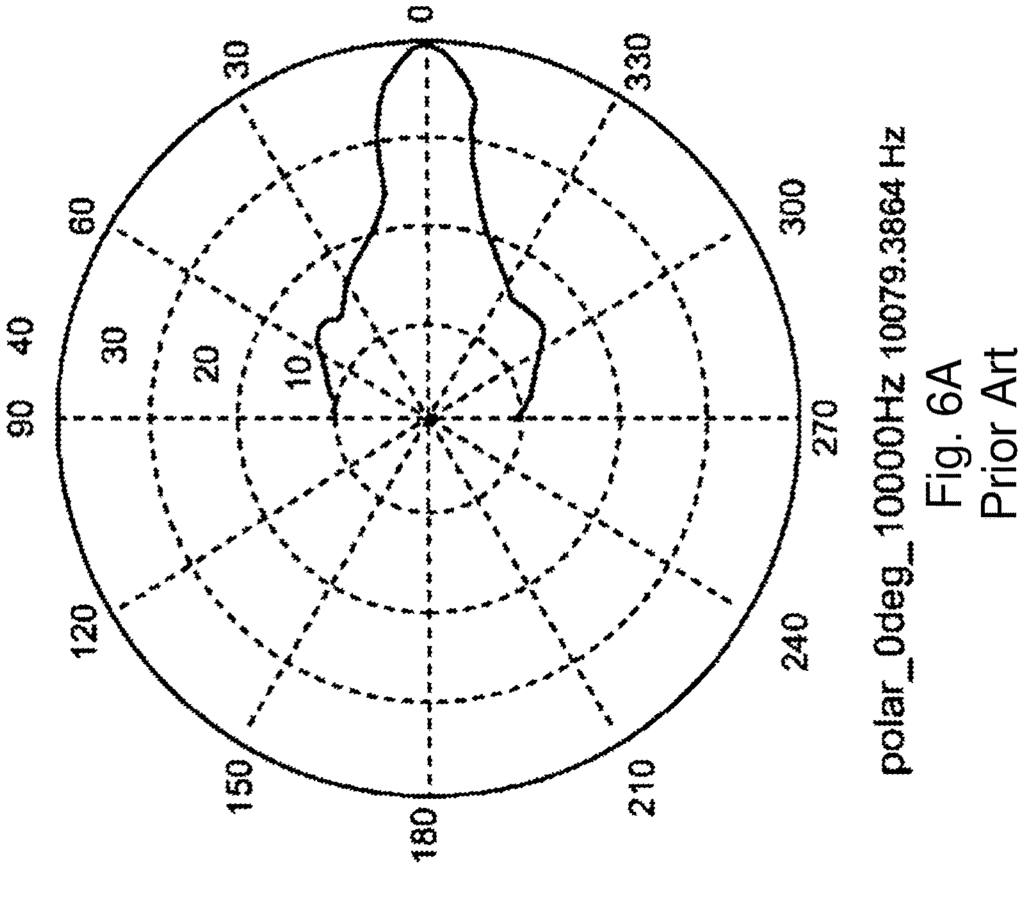
Fig. 6A Prior Art
Figure 6C:
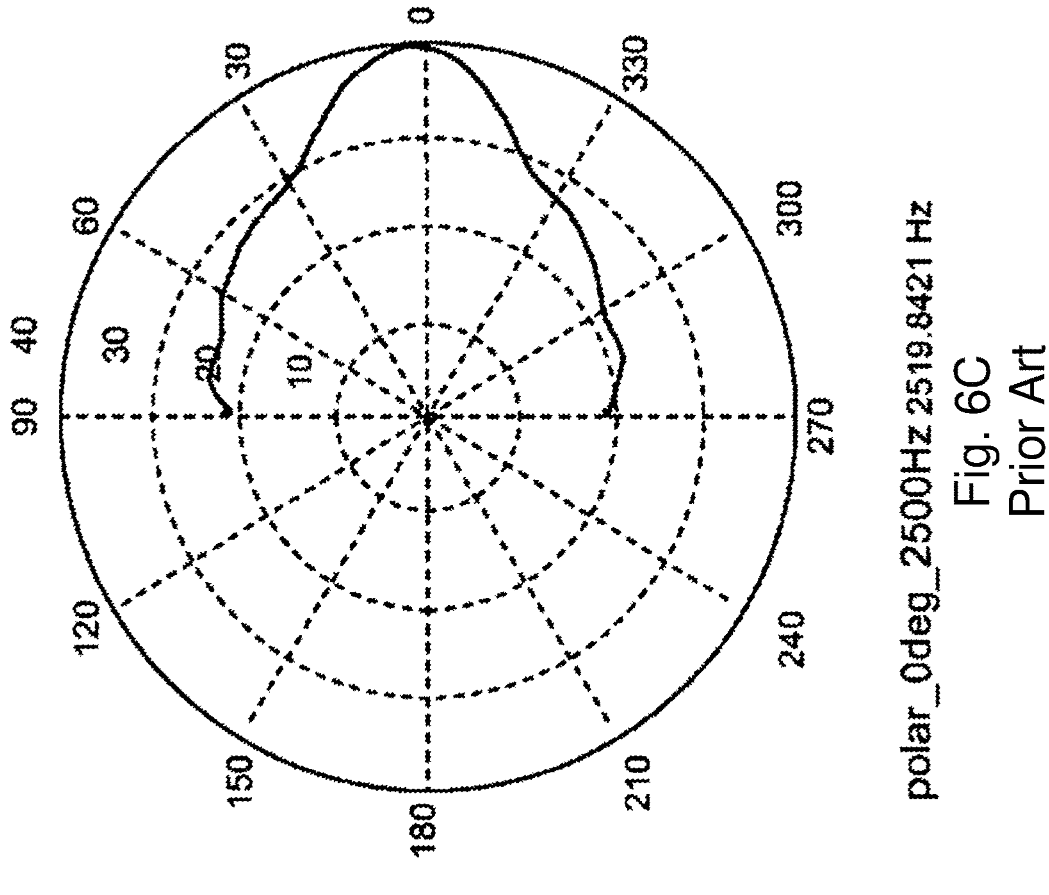
Fig. 6C Prior Art
Figure 6D:
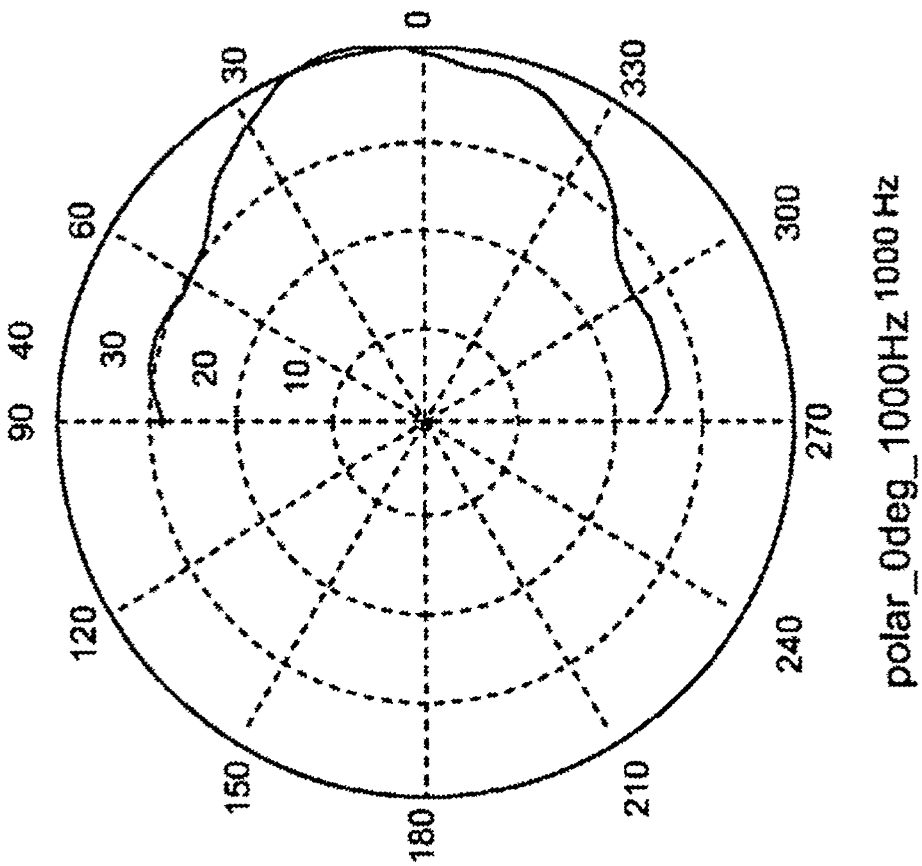
Fig. 6D Prior Art
Figure 6E:
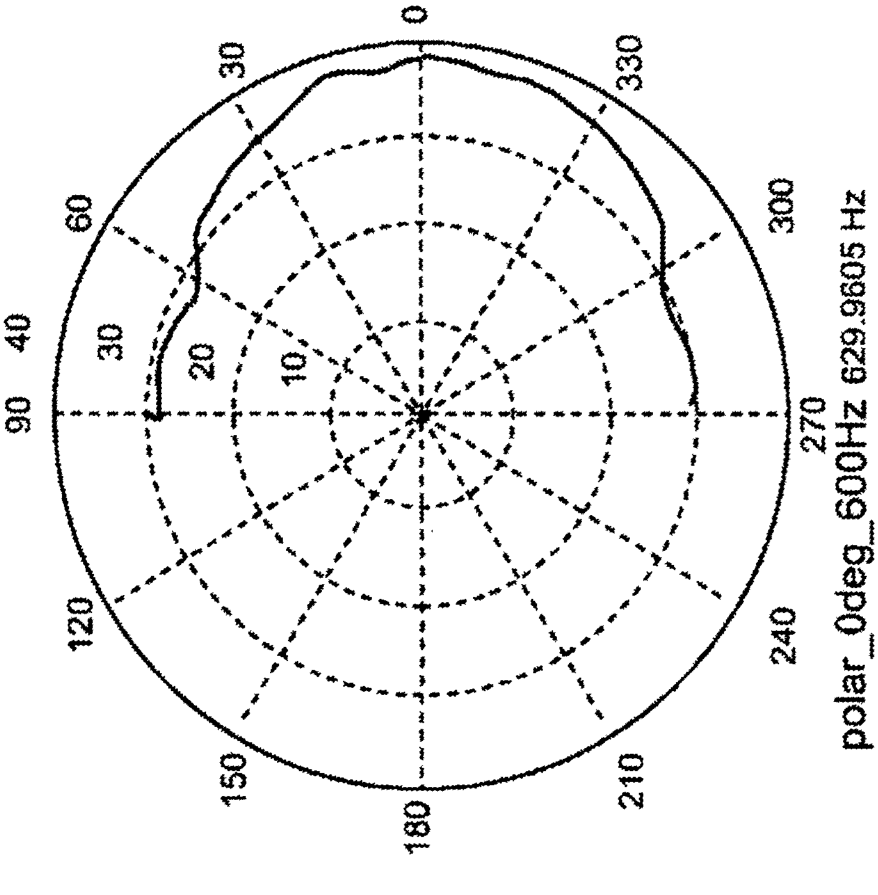
Fig. 6E Prior Art

FIG. 5 illustrates an alternative embodiment of the binaural mode signal processing chain of FIG. 4 which includes the use of optional components including a psychoacoustic bandwidth extension processor (PBEP) and a dynamic range compressor and expander (DRCE), which provides more sophisticated dynamic range and masking control, customization of filtering algorithms to particular environments, room equalization, and distance-based attenuation control.

The PBEP 112 allows the listener to perceive sound information contained in the lower part of the audio spectrum by generating higher frequency sound material, providing the perception of lower frequencies using higher frequency sound). Since the PBE processing is non-linear, it is important that it comes before the spatialization filters 104. If the non-linear PBEP block 112 is inserted after the spatial filters, its effect could severely degrade the creation of the sound beam.

It is important to emphasize that the PBEP 112 is used in order to compensate (psycho-acoustically) for the poor directionality of the loudspeaker array at lower frequencies rather than compensating for the poor bass response of single loudspeakers themselves, as is normally done in prior art applications.

The DRCE 114 in the DSP chain provides loudness matching of the source signals so that adequate relative masking of the output signals of the array 108 is preserved. In the binaural rendering mode, the DRCE used is a 2-channel block which makes the same loudness corrections to both incoming channels.

As with the PBEP block 112, because the DRCE 114 processing is non-linear, it is important that it comes before the spatialization filters 104. If the non-linear DRCE block 114 were to be inserted after the spatial filters 104, its effect could severely degrade the creation of the sound beam. However, without this DSP block, psychoacoustic performance of the DSP chain and array may decrease as well.

Another optional component is a listener tracking device (LTD) 116, which allows the apparatus to receive information on the location of the listener(s) and to dynamically adapt the spatialization filters in real time. The LTD 116 may be a video tracking system which detects the listener's head movements or can be another type of motion sensing system as is known in the art. The LTD 116 generates a listener tracking signal which is input into a filter computation algorithm 118. The adaptation can be achieved either by re-calculating the digital filters in real time or by loading a different set of filters from a pre-computed database. Alternate user localization includes radar (e.g., heartbeat) or lidar tracking RFID/NFC tracking, breathsounds, etc.

FIGS. 6A-6E are polar energy radiation plots of the radiation pattern of a prototype array being driven by the DSP scheme operating in WFS mode at five different frequencies, 10,000 Hz, 5,000 Hz, 2,500 Hz, 1,000 Hz, and 600 Hz, and measured with a microphone array with the beams steered at 0 degrees.

Binaural Mode

The DSP for the binaural mode involves the convolution of the audio signal to be reproduced with a set of digital filters representing a Head-Related Transfer Function (HRTF).

Figure 7A:
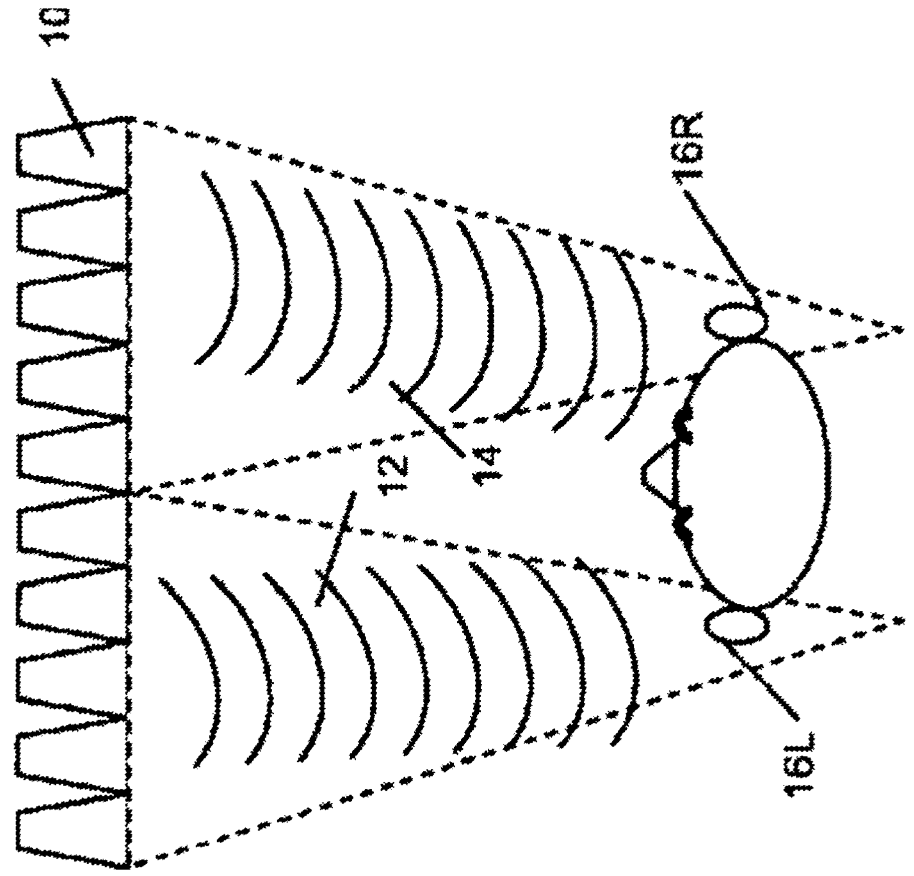
Fig. 7A Prior Art
FIG. 7A is a diagram illustrating the basic principle of binaural mode operation.

FIG. 7A illustrates the underlying approach used in binaural mode operation, where an array of speaker locations 10 is defined to produce specially-formed audio beams 12 and 14 that can be delivered separately to the listener's ears 16L and 16R. Using this mode, cross-talk cancellation is inherently provided by the beams. However, this is not available after summing and presentation through a smaller number of speakers.

Figure 7B:
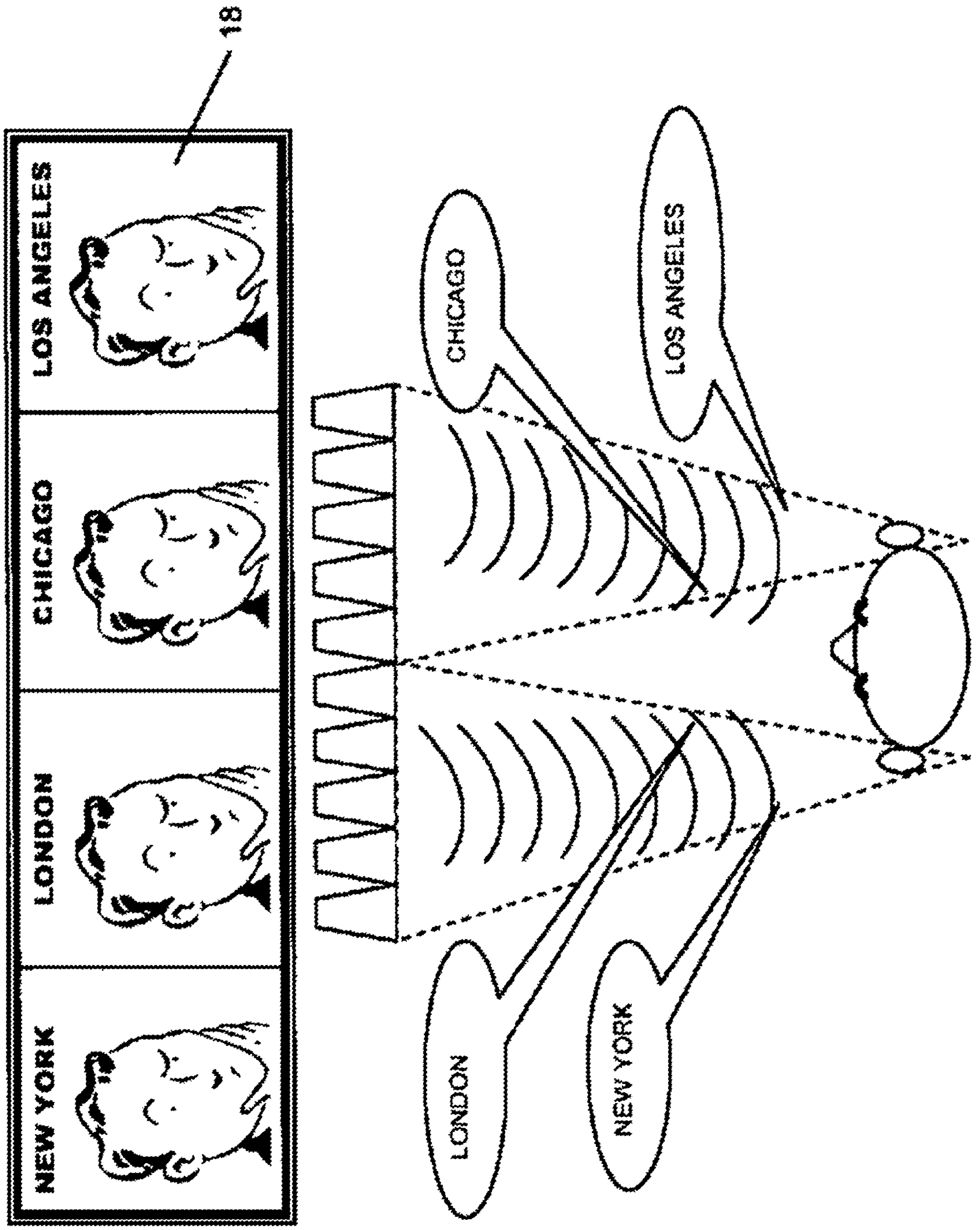
Fig. 7B Prior Art
FIG. 7B is a diagram illustrating binaural mode operation as used for spatialized sound presentation.

FIG. 7B illustrates a hypothetical video conference call with multiple parties at multiple locations. When the party located in New York is speaking, the sound is delivered as if coming from a direction that would be coordinated with the video image of the speaker in a tiled display 18. When the participant in Los Angeles speaks, the sound may be delivered in coordination with the location in the video display of that speaker's image. On-the-fly binaural encoding can also be used to deliver convincing spatial audio headphones, avoiding the apparent mis-location of the sound that is frequently experienced in prior art headphone set-ups.

Figure 8:
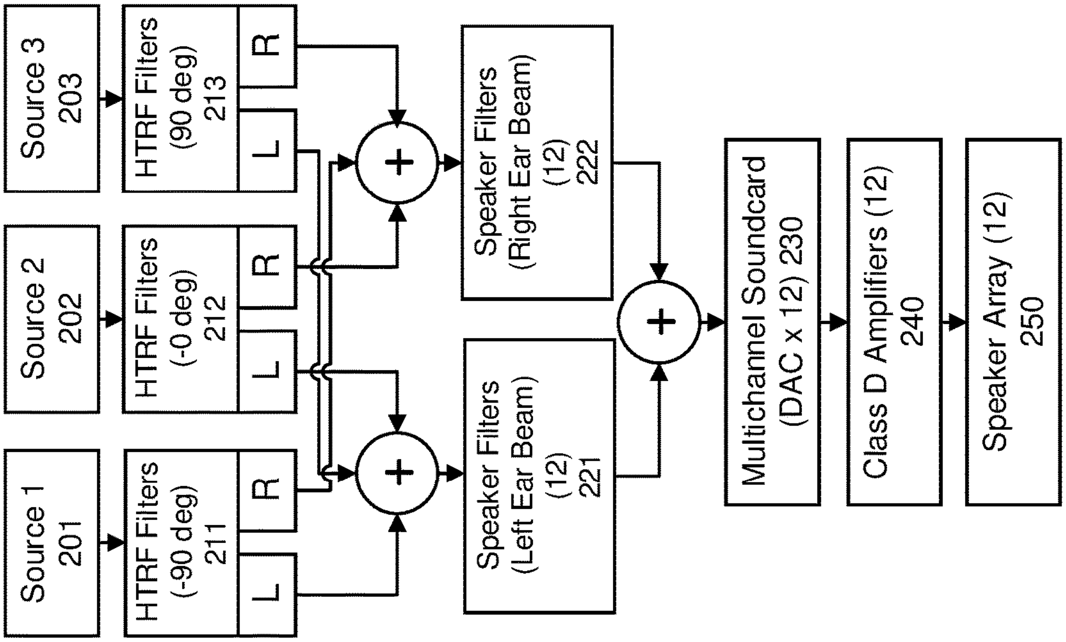
Fig. 8 Prior Art
FIG. 8 is a block diagram showing an exemplary binaural mode processing chain.

The binaural mode signal processing chain, shown in FIG. 8, consists of multiple discrete sources, in the illustrated example, three sources: sources 201, 202 and 203, which are then convolved with binaural Head Related Transfer Function (HRTF) encoding filters 211, 212 and 213 corresponding to the desired virtual angle of transmission from the nominal speaker location to the listener. There are two HRTF filters for each source—one for the left ear and one for the right ear. The resulting HRTF-filtered signals for the left ear are all added together to generate an input signal corresponding to sound to be heard by the listener's left ear. Similarly, the HRTF-filtered signals for the listener's right ear are added together. The resulting left and right ear signals are then convolved with inverse filter groups 221 and 222, respectively, with one filter for each virtual speaker element in the virtual speaker array. The virtual speakers are then combined into a real speaker signal, by a further time-space transform, combination, and limiting/peak abatement, and the resulting combined signal is sent to the corresponding speaker element via a multichannel sound card 230 and class D amplifiers 240 (one for each physical speaker) for audio transmission to the listener through speaker array 250.

In the binaural mode, the invention generates sound signals feeding a virtual linear array. The virtual linear array signals are combined into speaker driver signals. The speakers provide two sound beams aimed towards the primary listener's ears—one beam for the left ear and one beam for the right ear.

Figure 9:
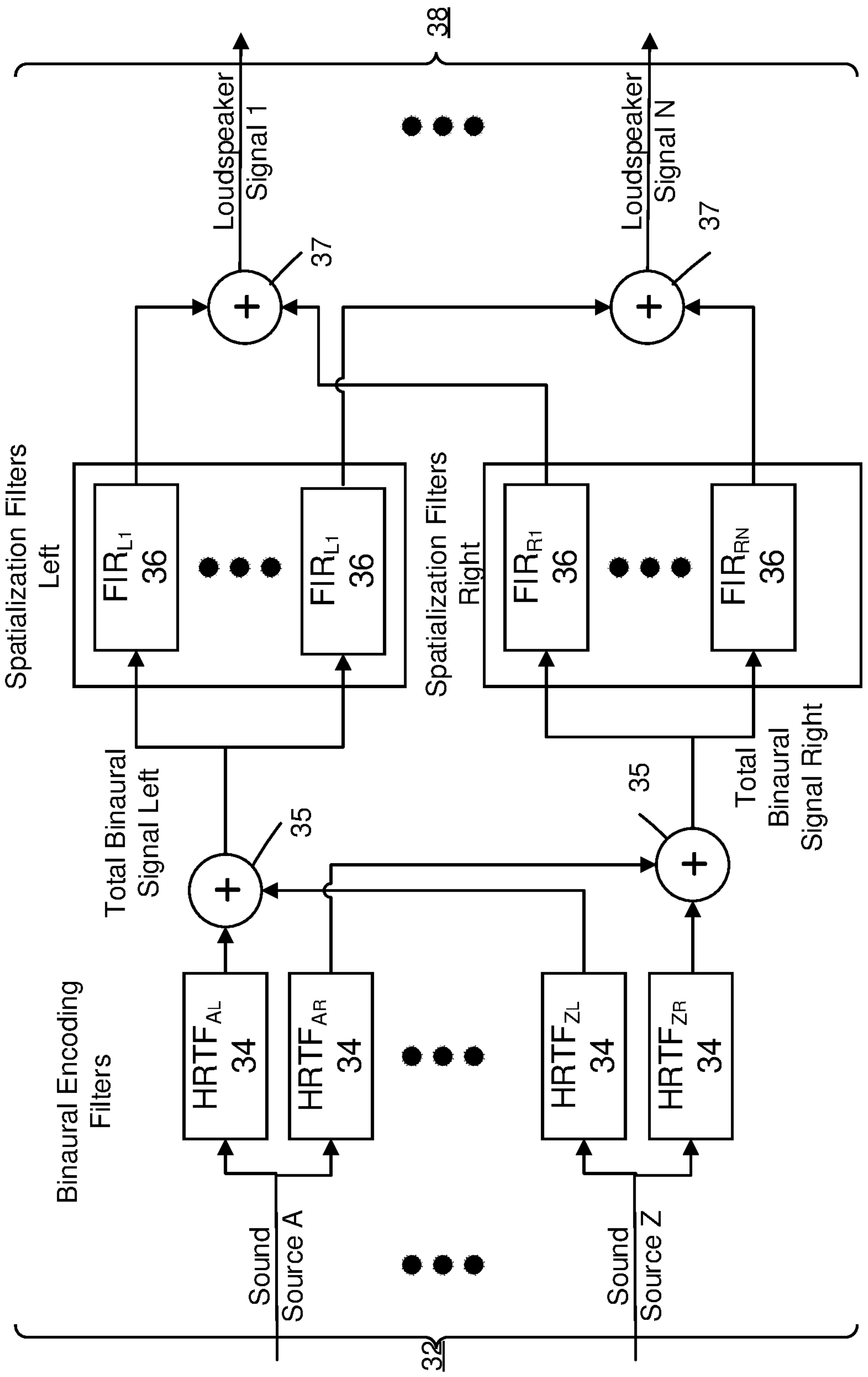
Fig. 9 Prior Art
FIG. 9 is a diagrammatic view of a first embodiment of a signal processing scheme for the binaural modality.

FIG. 9 illustrates the binaural mode signal processing scheme for the binaural modality with sound sources A through Z.

As described with reference to FIG. 8, the inputs to the system are a set of sound source signals 32 (A through Z) and the output of the system is a set of loudspeaker signals 38 (1 through N), respectively.

For each sound source 32, the input signal is filtered through two digital filters 34 (HRTF-L and HRTF-R) representing a left and right Head-Related Transfer Function, calculated for the angle at which the given sound source 32 is intended to be rendered to the listener. For example, the voice of a talker can be rendered as a plane wave arriving from 30 degrees to the right of the listener. The HRTF filters 34 can be either taken from a database or can be computed in real time using a binaural processor. After the HRTF filtering, the processed signals corresponding to different sound sources but to the same ear (left or right), are merged together at combiner 35 This generates two signals, hereafter referred to as "total binaural signal-left", or "TBS-L" and "total binaural signal-right" or "TBS-R" respectively.

Each of the two total binaural signals, TBS-L and TBS-R, is filtered through a set of N digital filters 36, one for each loudspeaker, computed using the algorithm disclosed below. These filters are referred to as "spatialization filters". It is emphasized for clarity that the set of spatialization filters for the right total binaural signal is different from the set for the left total binaural signal.

The filtered signals corresponding to the same $n^{th}$ virtual speaker but for two different ears (left and right) are summed together at combiners 37. These are the virtual speaker signals, which feed the combiner system, which in turn feed the physical speaker array 38.

Figure 10:
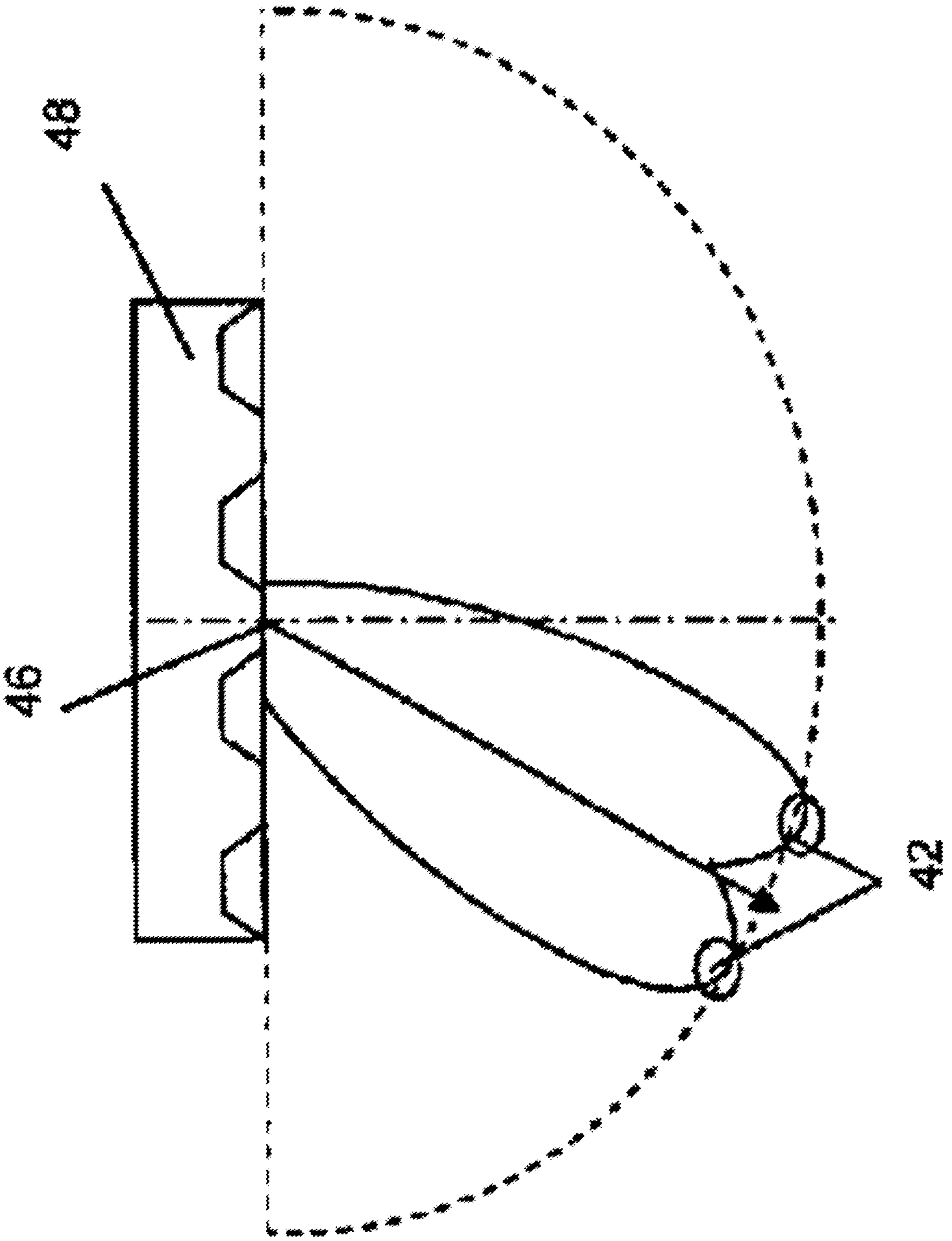
Fig. 10 Prior Art
FIG. 10 is a diagrammatic view of an exemplary arrangement of control points for binaural mode operation.

The algorithm for the computation of the spatialization filters 36 for the binaural modality is analogous to that used for the WFS modality described above. The main difference from the WFS case is that only two control points are used in the binaural mode. These control points correspond to the location of the listener's ears and are arranged as shown in FIG. 10. The distance between the two points 42, which represent the listener's ears, is in the range of 0.1 m and 0.3 m, while the distance between each control point and the center 46 of the loudspeaker array 48 can scale with the size of the array used, but is usually in the range between 0.1 m and 3 m.

The 2×N matrix H(f) is computed using elements of the electro-acoustical transfer functions between each loudspeaker and each control point, as a function of the frequency f. These transfer functions can be either measured or computed analytically, as discussed above. A 2-element vector p is defined. This vector can be either [1,0] or [0,1], depending on whether the spatialization filters are computed for the left or right ear, respectively. The filter coefficients for the given frequency f are the N elements of the vector a(f) computed by minimizing the following cost function $$J(f)=\|H(f)a(f)-p(f)\|^2+\beta\|a(f)\|^2$$

If multiple solutions are possible, the solution is chosen that corresponds to the minimum value of the $L^2$ norm of a(f).

Figure 11:
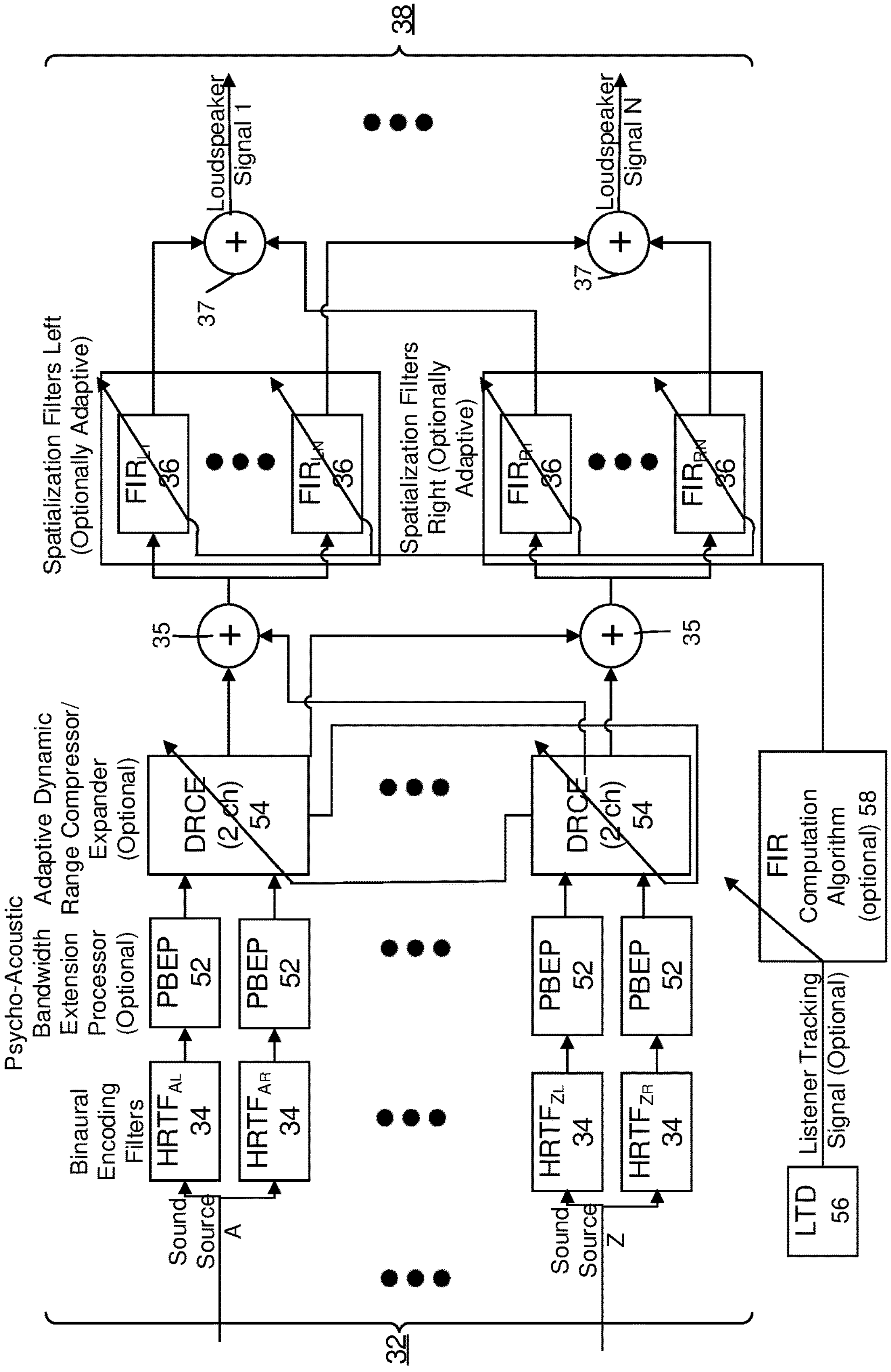
Fig. 11 Prior Art
FIG. 11 is a block diagram of a second embodiment of a signal processing chain for the binaural mode.

FIG. 11 illustrates an alternative embodiment of the binaural mode signal processing chain of FIG. 9 which includes the use of optional components including a psychoacoustic bandwidth extension processor (PBEP) and a dynamic range compressor and expander (DRCE). The PBEP 52 allows the listener to perceive sound information contained in the lower part of the audio spectrum by generating higher frequency sound material, providing the perception of lower frequencies using higher frequency sound). Since the PBEP processing is non-linear, it is important that it comes before the spatialization filters 36. If the non-linear PBEP block 52 is inserted after the spatial filters, its effect could severely degrade the creation of the sound beam.

It is important to emphasize that the PBEP 52 is used in order to compensate (psycho-acoustically) for the poor directionality of the loudspeaker array at lower frequencies rather than compensating for the poor bass response of single loudspeakers themselves.

The DRCE 54 in the DSP chain provides loudness matching of the source signals so that adequate relative masking of the output signals of the array 38 is preserved. In the binaural rendering mode, the DRCE used is a 2-channel block which makes the same loudness corrections to both incoming channels.

As with the PBEP block 52, because the DRCE 54 processing is non-linear, it is important that it comes before the spatialization filters 36. If the non-linear DRCE block 54 were to be inserted after the spatial filters 36, its effect could severely degrade the creation of the sound beam. However, without this DSP block, psychoacoustic performance of the DSP chain and array may decrease as well.

Another optional component is a listener tracking device (LTD) 56, which allows the apparatus to receive information on the location of the listener(s) and to dynamically adapt the spatialization filters in real time. The LTD 56 may be a video tracking system which detects the listener's head movements or can be another type of motion sensing system as is known in the art. The LTD 56 generates a listener tracking signal which is input into a filter computation algorithm 58. The adaptation can be achieved either by re-calculating the digital filters in real time or by loading a different set of filters from a pre-computed database.

Figure 12A:
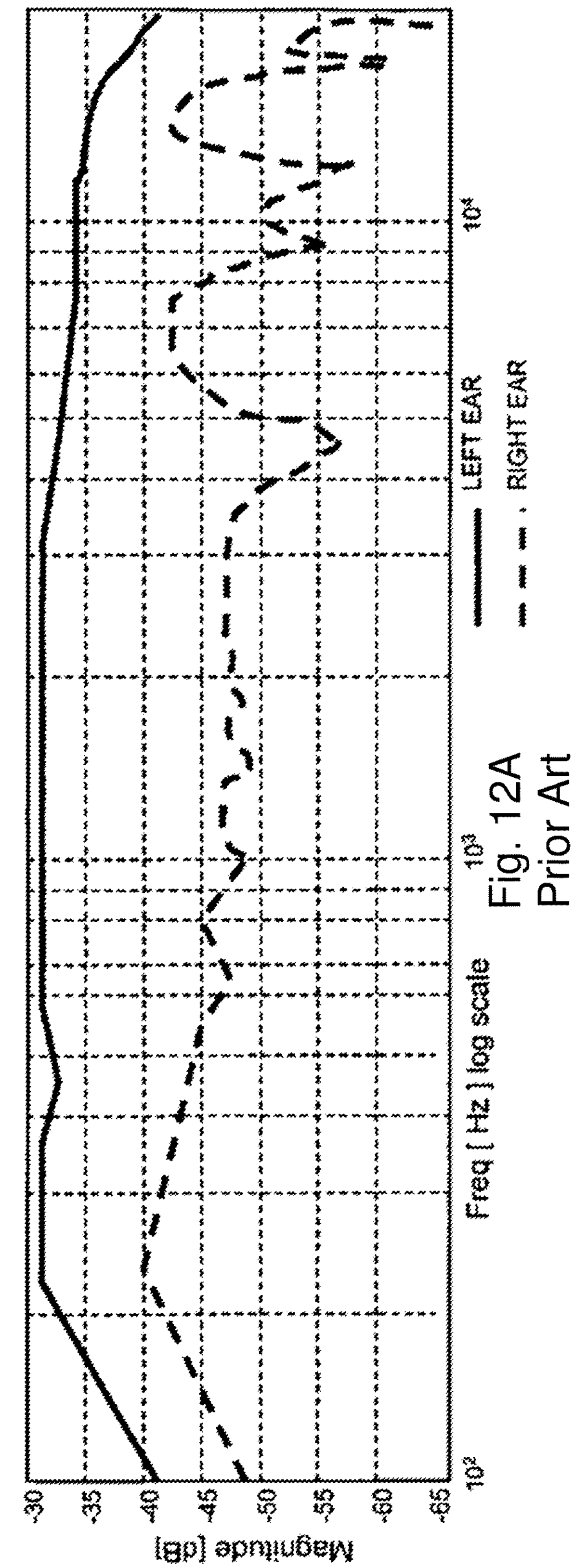
Fig. 12A Prior Art
FIGS. 12A and 12B illustrate simulated frequency domain and time domain representations, respectively, of predicted performance of an exemplary speaker array in binaural mode measured at the left ear and at the right ear.
Figure 12B:
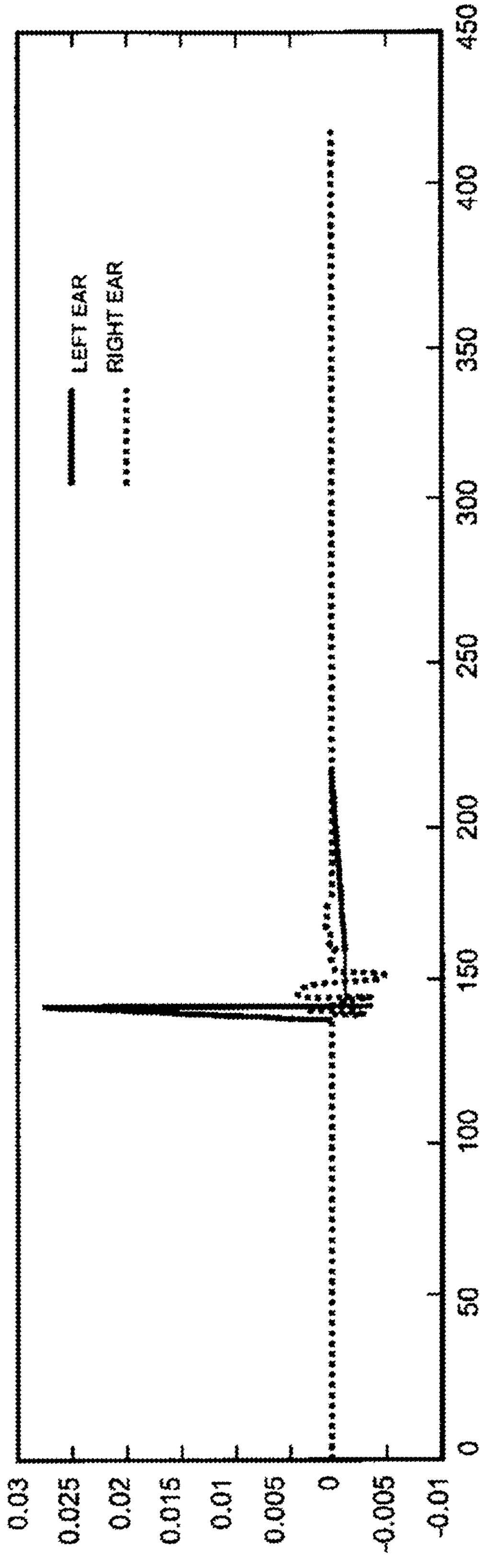
Fig. 12B Prior Art
Figure 13:
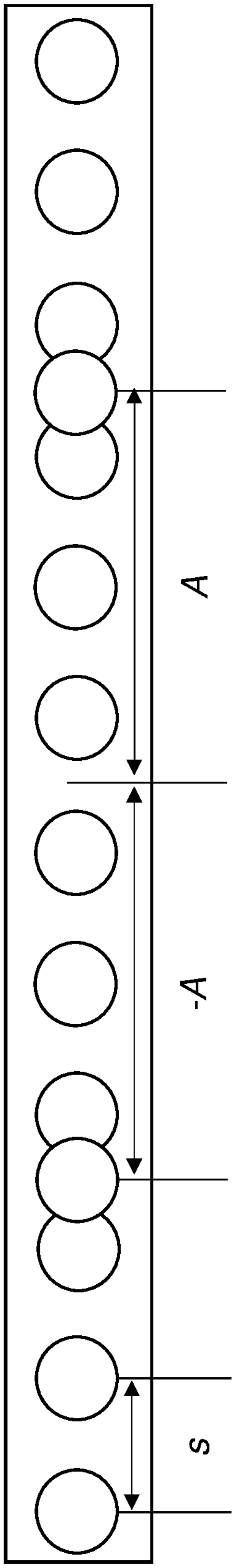
FIG. 13 shows the relationship between the virtual speaker array and the physical speakers.

FIGS. 12A and 12B illustrate the simulated performance of the algorithm for the binaural modes. FIG. 12A illustrates the simulated frequency domain signals at the target locations for the left and right ears, while FIG. 12B shows the time domain signals. Both plots show the clear ability to target one ear, in this case, the left ear, with the desired signal while minimizing the signal detected at the listener's right ear.

WFS and binaural mode processing can be combined into a single device to produce total sound field control. Such an approach would combine the benefits of directing a selected sound beam to a targeted listener, e.g., for privacy or enhanced intelligibility, and separately controlling the mixture of sound that is delivered to the listener's ears to produce surround sound. The device could process audio using binaural mode or WFS mode in the alternative or in combination. Although not specifically illustrated herein, the use of both the WFS and binaural modes would be represented by the block diagrams of FIG. 5 and FIG. 11, with their respective outputs combined at the signal summation steps by the combiners 37 and 106. The use of both WFS and binaural modes could also be illustrated by the combination of the block diagrams in FIG. 2 and FIG. 8, with their respective outputs added together at the last summation block immediately prior to the multichannel soundcard 230.

EXAMPLE

A 12-channel spatialized virtual audio array is implemented in accordance with U.S. Pat. No. 9,578,440. This virtual array provides signals for driving a linear or curvilinear equally-spaced array of e.g., 12 speakers situated in front of a listener. The virtual array is divided into two or four. In the case of two, the "left" e.g., 6 signals are directed to the left physical speaker, and the "right" e.g., 6 signals are directed to the right physical speaker. The virtual signals are to be summed, with at least two intermediate processing steps.

The first intermediate processing step compensates for the time difference between the nominal location of the virtual speaker and the physical location of the speaker transducer. For example, the virtual speaker closest to the listener is assigned a reference delay, and the further virtual speakers are assigned increasing delays. In a typical case, the virtual array is situated such that the time differences for adjacent virtual speakers are incrementally varying, though a more rigorous analysis may be implemented. At a 48 kHz sampling rate, the difference between the nearest and furthest virtual speaker may be, e.g., 4 cycles.

The second intermediate processing step limits the peaks of the signal, in order to avoid over-driving the physical speaker or causing significant distortion. This limiting may be frequency selective, so only a frequency band is affected by the process. This step should be performed after the delay compensation. For example, a compander may be employed. Alternately, presuming only rare peaking, a simple limiter may be employed. In other cases, a more complex peak abatement technology may be employed, such as a phase shift of one or more of the channels, typically based on a predicted peaking of the signals which are delayed slightly from their real-time presentation. Note that this phase shift alters the first intermediate processing step time delay; however, when the physical limit of the system is reached, a compromise is necessary.

With a virtual line array of 12 speakers, and 2 physical speakers, the physical speaker locations are between elements 3-4 and 9-10. If (s) is the center-to-center distance between speakers, then the distance from the center of the array to the center of each real speaker is: A=3s. The left speaker is offset −A from the center, and the right speaker is offset A.

The second intermediate processing step is principally a downmix of the six virtual channels, with a limiter and/or compressor or other process to provide peak abatement, applied to prevent saturation or clipping. For example, the left channel is:

$$L_{out}=\text{Limit}(L_1+L_2+L_3+L_4+L_5+L_6)$$

and the right channel is $$R_{out}=\text{Limit}(R_1+R_2+R_3+R_4+R_5+R_6)$$

Before the downmix, the difference in delays between the virtual speakers and the listener's ears, compared to the physical speaker transducer and the listener's ears, need to be taken into account. This delay can be significant particularly at higher frequencies, since the ratio of the length of the virtual speaker array to the wavelength of the sound increases. To calculate the distance from the listener to each virtual speaker, assume that the speaker, n, is numbered 1 to 6, where 1 is the speaker closest to the center, and 6 is the farthest from center. The distance from the center of the array to the speaker is: d=((n−1)+0.5)*s. Using the Pythagorean theorem, the distance from the speaker to the listener can be calculated as follows:

$$d_n=\sqrt{l^2+(((n-1)+0.5)*s)^2}$$

The distance from the real speaker to the listener is $$d_r=\sqrt{l^2+(3*s)^2}$$

The sample delay for each speaker can be calculated by the different between the two listener distances. This can them be converted to samples (assuming the speed of sound is 343 m/s and the sample rate is 48 kHz.

$$\text{delay}=\frac{(d_n-d_r)}{343\frac{m}{s}}*48000\text{ Hz}$$

This can lead to a significant delay between listener distances. For example, if the virtual array inter-speaker distance is 38 mm, and the listener is 500 mm from the array, the delay from the virtual far-left speaker (n=6) to the real speaker is:

$$d_n=\sqrt{.5^2+(5.5*.038)^2}=.541\text{ m}$$

$$d_r=\sqrt{.5^2+(3*.038)^2}=.513\text{ m}$$

$$\text{delay}=\frac{.541-.512}{343}*48000=4\text{ samples}$$

At higher audio frequencies, i.e., 12 kHz an entire wave cycle is 4 samples, to the difference amounts to a 360° phase shift. See Table 1.

Thus, when combining the signals for the virtual speakers into the physical speaker signal, the time offset is preferably compensated based on the displacement of the virtual speaker from the physical one. The time offset may also be accomplished within the spatialization algorithm, rather than as a post-process.

The invention can be implemented in software, hardware or a combination of hardware and software. The invention can also be embodied as computer readable code on a computer readable medium. The computer readable medium can be any data storage device that can store data which can thereafter be read by a computing device. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A transaural spatialized sound system for presenting spatialized sound to ears of a listener, comprising:

- an input port configured to receive audio information in a plurality of channels; and
- a processor configured to:
  - spatially filter each respective channel to generate a virtual spatial array of virtual audio signals representing spatialized audio, having a larger number of virtual audio signals than a number of channels;
  - map a plurality of the virtual audio signals to a plurality of physical transducers to produce transducer signals, wherein a number of number of virtual audio signals is greater than a number of physical transducers, the plurality of virtual audio signals mapped to a respective physical transducer being time-offset based on at least an estimated time difference of arrival at the ears of the listener; and
  - an output port configured to convey the transducer signals for the plurality of physical transducers.

2. The transaural spatialized sound system according to claim 1, wherein the received audio information in the plurality of channels represent audio objects having a spatial relationship.

3. The transaural spatialized sound system according to claim 1, wherein the processor is further configured to analyze the transducer signals to predict a distorted output of at least one physical transducer due to the mapping of the virtual audio signals to the plurality of physical transducers.

4. The transaural spatialized sound system according to claim 3, wherein the processor is further configured to selectively alter a phase of some of the virtual audio signals for the respective physical transducer in dependence on the predicted distorted output.

5. The transaural spatialized sound system according to claim 1, wherein the generated virtual spatial array of virtual audio signals representing spatialized audio comprises 12 virtual audio signals corresponding to a linear array of audio transducers.

6. The transaural spatialized sound system according to claim 5, wherein the virtual spatial array of 12 virtual audio signals representing spatialized audio is divided into two non-overlapping groups of 6 adjacent virtual audio signals, which are respectively mapped to define 2 transducer signals.

7. The transaural spatialized sound system according to claim 1, wherein the generated virtual spatial array of virtual audio signals representing spatialized audio comprises a number of virtual audio signals in a linear array of virtual audio transducers, wherein the number of virtual audio signals is at least three times a number of physical transducers.

8. The transaural spatialized sound system according to claim 1, further comprising at array of physical transducers each being configured to reproduce sounds corresponding to a respective transducer signal.

9. The transaural spatialized sound system according to claim 1, wherein each physical transducer is mapped to a non-overlapping subset of the generated virtual spatial array of virtual audio signals with respect to the other physical transducers.

10. The transaural spatialized sound system according to claim 1, wherein a different continuous subset of the generated virtual spatial array of virtual audio signals having a represented range of locations is mapped to each physical transducer.

11. The transaural spatialized sound system according to claim 1, wherein the automated processor is further configured to perform cross-talk cancellation.

12. The transaural spatialized sound system according to claim 1, wherein the automated processor is configured as a plurality of reentrant data filters for the spatial filtration.

13. The transaural spatialized sound system according to claim 1, wherein the automated processor is further configured to compute a head related transfer function.

14. The transaural spatialized sound system according to claim 1, further an input port for receiving a tracked movement of the listener, wherein the spatial filtration by the automated processor is dependent on the tracked movement.

15. A system for producing transaural spatialized sound, comprising:

- a memory configured to store parameters of a head related transfer function;
- an input port configured to receive at least two audio channel signals representing acoustic emissions from spatial objects;
- a spatially filter configured to generate a virtual spatial array of virtual audio signals representing spatialized audio, having a larger number of virtual audio signals than a number of channels, based on the head related transfer function and the at least two audio channel signals;
- a mapper, configured to map a plurality of the virtual audio signals into a respective physical transducer signal for each of a plurality of transducer signals, wherein a number of number of virtual audio signals is greater than a number of respective physical transducer signals, the plurality of virtual audio signals being time-offset with a time delay element based on at least an estimated time difference of arrival at the ears of the listener; and
- an output port configured to present the physical transducer signals.

16. The system according to claim 15, wherein the virtual spatial array of virtual audio signals is segregated into mutually exclusive subsets each representing a physical location range, each mutually exclusive subset comprising a plurality of virtual audio signals which are merged by the combiner for driving a plurality of physical audio transducers situated within a physical location range of the respective subset with the physical transducer signals.

17. The system according to claim 15, further comprising a peak abatement filter configured to reduce a predicted amplitude-related distortion of a physical audio transducer by a respective physical transducer driven by the physical transducer signal, by selectively modifying a proper subset of the virtual spatial array of virtual audio signals.

18. The system according to claim 17, wherein the peak abatement filter comprises a phase rotator configured to rotate a relative phase of at least one virtual audio signal.

19. A method for presenting spatialized sound to ears of a listener, comprising:

receiving audio information in a plurality of channels;

spatially filtering each respective channel to generate a virtual spatial array of virtual audio signals representing spatialized audio, having a larger number of virtual audio signals than a number of channels, with at least one automated processor;

mapping a plurality of the virtual audio signals to a plurality of physical transducers to produce transducer signals, wherein a number of number of virtual audio signals is greater than a number of physical transducers, the plurality of virtual audio signals mapped to a respective physical transducer being time-offset based on at least an estimated time difference of arrival at the ears of the listener, with the at least one automated processor; and conveying the transducer signals for the plurality of physical transducers.

20. The method according to claim 19, wherein the received audio information in the plurality of channels represent audio objects having a spatial relationship, further comprising:

analyzing the transducer signals to predict a distorted output of at least one physical transducer due to the mapping of the virtual audio signals to the plurality of physical transducers;

selectively altering the time-offsetting of the virtual audio signals for the respective physical transducer in dependence on the predicted distorted output;

performing cross-talk cancellation;

computing a head-related transfer function;

tracking a movement of the listener, wherein the spatial filtration is dependent on the tracked movement and the head related transfer function.

* * * * *